(12) United States Patent
Nishikawa et al.

(10) Patent No.: US 7,261,931 B2
(45) Date of Patent: Aug. 28, 2007

(54) REFLECTION PREVENTING FILM LAMINATED BODY AND METHOD OF MANUFACTURING THE LAMINATED BODY

(75) Inventors: Akira Nishikawa, Tokyo (JP); Naoki Sugiyama, Tokyo (JP); Hiroomi Shimomura, Tokyo (JP)

(73) Assignee: JSR Corporation, Tokyo (JP)

( * ) Notice: Subject to any disclaimer, the term of this patent is extended or adjusted under 35 U.S.C. 154(b) by 170 days.

(21) Appl. No.: 10/482,333

(22) PCT Filed: Jun. 28, 2002

(86) PCT No.: PCT/JP02/06574

§ 371 (c)(1),
(2), (4) Date: Dec. 29, 2003

(87) PCT Pub. No.: WO03/003074

PCT Pub. Date: Jan. 9, 2003

(65) Prior Publication Data

US 2004/0191478 A1      Sep. 30, 2004

(30) Foreign Application Priority Data

Jun. 29, 2001 (JP) .............................. 2001-237159

(51) Int. Cl.
*B32B 3/00* (2006.01)
(52) U.S. Cl. .................. 428/141; 428/194; 428/195.1; 428/201; 428/204
(58) Field of Classification Search ................ 428/141, 428/195.1, 194, 201, 204
See application file for complete search history.

(56) References Cited

U.S. PATENT DOCUMENTS

| | | | | |
|---|---|---|---|---|
| 3,949,131 | A | * | 4/1976 | Fraser ......................... 428/201 |
| 5,494,743 | A | * | 2/1996 | Woodard et al. ............ 428/336 |
| 5,744,227 | A | * | 4/1998 | Bright et al. ................ 428/216 |
| 5,925,438 | A | | 7/1999 | Ota et al. |
| 2003/0096102 | A1 | | 5/2003 | Yoshihara |

FOREIGN PATENT DOCUMENTS

EP      1 094 340 A2     4/2001
EP      1 260 835 A2     11/2002

(Continued)

OTHER PUBLICATIONS

CRC Handbook of Chemistry and Physics; 61st edition, 1980-1981, p. B109.*

(Continued)

*Primary Examiner*—John J. Zimmerman
*Assistant Examiner*—G. Blackwell
(74) *Attorney, Agent, or Firm*—Oblon, Spivak, McClelland, Maier & Neustadt, P.C.

(57) ABSTRACT

An antireflection film laminate comprising a low refractive index film on the surface side and a high refractive index film which is disposed under the low refractive index film in contact therewith, wherein the high refractive index film is formed as a discontinuous layer in the planar direction. If the high refractive index film is formed as a discontinuous layer, the high refractive index film can enter into the low refractive index film to restrain movement of the low refractive index film, and therefore an antireflection film laminate exhibiting superior antiscratching property and transparency can be obtained.

5 Claims, 13 Drawing Sheets

FOREIGN PATENT DOCUMENTS

| | | |
|---|---|---|
| JP | 61-247743 | 11/1986 |
| JP | 5-13021 | 1/1993 |
| JP | 5-27102 | 2/1993 |
| JP | 06-025599 | 2/1994 |
| JP | 07-331115 | 12/1995 |
| JP | 08-094806 | 4/1996 |
| JP | 10-232301 | 9/1998 |
| JP | 2000-28804 | 1/2000 |
| JP | 2001-100005 | 4/2001 |
| WO | WO 02/055612 A1 | 7/2002 |

OTHER PUBLICATIONS website http://www.cerac.com/pubspproddata/ito.htm.*
Patent Abstracts of Japan, JP 2000-275401, Oct. 6, 2000.

* cited by examiner

REFLECTION PREVENTING FILM LAMINATED BODY AND METHOD OF MANUFACTURING THE LAMINATED BODY

CROSS-REFERENCE TO RELATED APPLICATIONS

This application is a 371 application of PCT/JP02/06574 filed Jun. 28, 2002.

TECHNICAL FIELD

The present invention relates to an antireflection film laminate and a method for producing the same. More precisely, the present invention relates to an antireflection film laminate exhibiting superior antiscratching property and transparency and a method for producing the same.

BACKGROUND ART

As materials for forming an antireflection film, for example, heat-curable type polysiloxane compositions are known, and they are disclosed in JP-A-61-247743, JP-A-6-25599, JP-A-7-331115, JP-A-10-232301 and so forth.

However, antireflection films obtained by using such heat-curable type polysiloxane compositions are formed with a layer continuous in the planar direction, and therefore they have a problem that they suffer from insufficient antiscratching property and as a result, insufficient durability.

Further, in the production of such antireflection films, a heat treatment at a high temperature for a long period of time is required. Thus, they suffer from problems of low productivity and limited types of applicable substrates.

Therefore, as disclosed in JP-A-8-94806, an optically functional film has been proposed which is prepared by laminating a high refractive index film comprising fine particles localized in a high refractive index binder resin and formed as a layer continuous in the planer direction and a low refractive index film made of a fluorine type copolymer in this order on a substrate.

More specifically, for forming the high refractive index film as a continuous layer, a layer of fine particles such as metal oxide particles having a diameter of 200 nm or less is formed on process paper in advance, and the layer is then pressed onto the high refractive index binder resin on the substrate to embed the fine particle layer in the high refractive index binder resin and thereby localize the fine particles.

Further, the low refractive index film is formed by curing a resin composition comprising 100 parts by weight of a fluorine-containing copolymer formed by copolymerizing of a monomer composition containing 30 to 90% by weight of vinylidene fluoride and 5 to 50% by weight of hexafluoropropylene, and having a fluorine content of 60 to 70% by weight, 30 to 150 parts by weight of a polymerizable compound having an ethylenically unsaturated group and a polymerization initiator in an amount of 0.5 to 10 parts by weight with respect to the total weight of the fluorine-containing copolymer and the polymerizable compound taken as 100 parts by weight to form a thin film having a film thickness of 200 nm or less.

However, the process of producing the high refractive index film of the optically functional film disclosed in JP-A-8-94806 as a continuous layer is complicated, and as a result, it is difficult to prepare an optically functional film exhibiting uniform characteristics.

Furthermore, in such an optically functional film, surface toughness of the low refractive index film, relationship thereof with film thickness and surface roughness value of the high, refractive index film are not taken into consideration, and therefore it suffers from a problem of insufficient antiscratching property of the low refractive index film.

DISCLOSURE OF THE INVENTION

Therefore, the inventors of the present invention have assiduously conducted researches, and as a result, they have found that the aforementioned problems could be solved by, in an antireflection film laminate comprising a low refractive index film on the surface side and a high refractive index film disposed under the low refractive index film in contact therewith, making the high refractive index film as a layer discontinuous in the planar direction.

That is, an object of the present invention is to provide an antireflection film laminate exhibiting superior antiscratching property and transparency in spite of a simple structure thereof.

According to the present invention, there is provided an antireflection film laminate comprising a low refractive index film on the surface side and a high refractive index film which is disposed under the low refractive index film in contact therewith and is a discontinuous layer, and thereby the aforementioned problems can be solved.

That is, by forming the high refractive index film as a discontinuous layer so that a base (e.g., a hardcoat layer) should be partially exposed, the high refractive index film can be easily formed as-a film having an uneven surface profile. Therefore, the high refractive index film itself can be entered into the low refractive index film to restrain the movement of the low refractive index film, and thereby the antiscratching property of the low refractive index film can be markedly improved.

That is, even if the low refractive index film consisting of a relatively soft fluorine type resin or silicone type resin is used, the antiscratching property of the low refractive index film can be improved while maintaining superior transparency thereof.

Further, in the antireflection film laminate of the present invention, the high refractive index film is preferably disposed in an island pattern in the planar direction.

If the high refractive index film is formed in a relatively regular island pattern as described above, the control of the surface roughness value (Rz) of the high refractive index film becomes further easier, and as a result, the antiscratching property of the low refractive index film can be further improved.

That is, by suitably changing the film thickness of the high refractive index film formed in an island pattern, the value of surface roughness (Rz) can be controlled within a wide range with good precision, and therefore control of the antiscratching property of the low refractive index film becomes easier.

Further, in the antireflection film laminate of the present invention, the refractive index of the low refractive index film is preferably controlled to be in the range of 1.35 to 1.5, and the refractive index of the high refractive index film is preferably controlled to be in the range of 1.45 to 2.1, so that the refractive index of the high refractive index film should be larger than that of the low refractive index film.

By controlling the refractive indexes of the low refractive index film and the high refractive index film as described above, superior antireflection effect can surely be obtained in use as an antireflection film or the like.

Further, in the antireflection film laminate of the present invention, a hardcoat layer is preferably provided under the high-refractive index film.

If a hardcoat layer is formed as described above, the hardcoat layer can firmly fix the high refractive index film, and as a result, the antiscratching property of the low refractive index film on the surface side can be further improved.

Furthermore, in the antireflection film laminate of the present invention, another high refractive index film is preferably further provided as a continuous layer under the high refractive index film.

By using such a configuration as described above, the low refractive index film on the surface side can inevitably be in contact with the high refractive index film as a discontinuous layer or a continuous layer, and as a result, more superior antireflection effect can be obtained.

Further, in the antireflection film laminate of the present invention, an intermediate layer having a refractive index larger than the refractive index of the low refractive index film and the same as or smaller than the refractive index of the high refractive index film is preferably provided between the low refractive index film and the high refractive index film.

If such an intermediate layer is formed as described above, the surface unevenness of the high refractive index film as a discontinuous layer can be accurately controlled, and as a result, the antiscratching property of the low refractive index film can be more improved.

Further, in the antireflection film laminate of the present invention, when surface roughness (Rz according to JIS B0601) of the low refractive index film is represented by R1 ($\mu$m), surface roughness (Rz according to JIS B0601) of the high refractive index film is represented by R2 ($\mu$m), and film thickness of the low refractive index film is represented by D1 ($\mu$m), it is preferred that R1 should be 2 $\mu$m or less, R2 should be larger than R1 and in the range of 0.01 to 2 $\mu$m, and the ratio of R1/D1 should be in the range of 0.01 to 2.

That is, if the relationship between the surface roughness (R1) and film thickness (D1) of the low refractive index film disposed on the surface side, and the surface roughness value (R2) of the high refractive index film as a discontinuous layer are selected as described above, unevenness provided on the surface of the high refractiveindex film appropriately enters into the low refractive index film.

Therefore, when a stress (friction) is given from the outside, movement of the low refractive index film can be restrained, and thus distortion generated in the low refractive index film can be markedly reduced. As a result, the antiscratching property of the low refractive index film can be markedly improved.

Further, by selecting the relationship between the surface roughness(R1) and the film thickness (D1) of the low refractive index film as described above, light scattering in the low refractive index film can be effectively prevented. Therefore, the light transmission in the visible light region (total light transmission) can be made high, and thus an antireflection film laminate comprising a low refractive index film exhibiting superior transparency can be provided.

Another embodiment of the present invention is a method for producing an antireflection film laminate, which comprises forming a low refractive index film having a refractive index of 1.35 to 1.5 and forming a high refractive index film having a refractive index of 1.45 to 2.1 as a discontinuous layer in the planar direction.

If an antireflection film laminate is produced as described above, an antireflection film laminate exhibiting superior antiscratching property and transparency can be effectively obtained in spite of the simple structure thereof.

That is, even if the low refractive index film is formed by using a relatively soft fluorine type resin or silicone type resin, an antireflection film laminate comprising a low refractive index film exhibiting improved antiscratching property can be produced, while maintaining superior transparency.

Further, in the method for producing an antireflection film laminate of the present invention, the high refractive index film is preferably formed by an application method, photolithography method, film pressing method, or embossing method (including matting treatment).

By producing an antireflection film laminate as described above, an antireflection film laminate comprising a high refractive index film as a discontinuous layer can be provided easily and moreover, with good precision.

BEST MODE FOR CARRYING OUT THE INVENTION

Embodiments of the antireflection film laminate of the present invention and the method for producing the same will be specifically explained by referring to the appended drawings.

Figure 1:
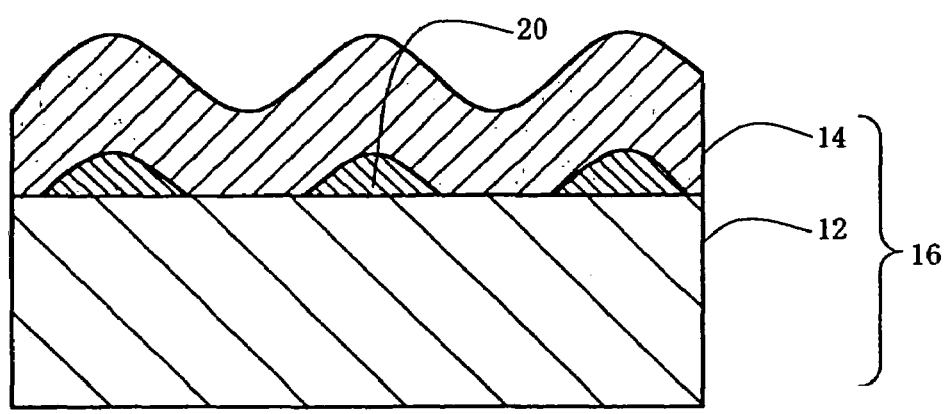
FIG. 1 is a sectional view of an example of the antireflection film laminate of the present invention.

That is, as shown in FIG. 1, the first embodiment is an antireflection film laminate 16 comprising a high refractive index film 20 (also referred to as the "second layer") as a discontinuous layer and a low refractive index film 14 (also referred to as the "first layer") as a continuous layer on a substrate 12 in this order.

Figure 2:
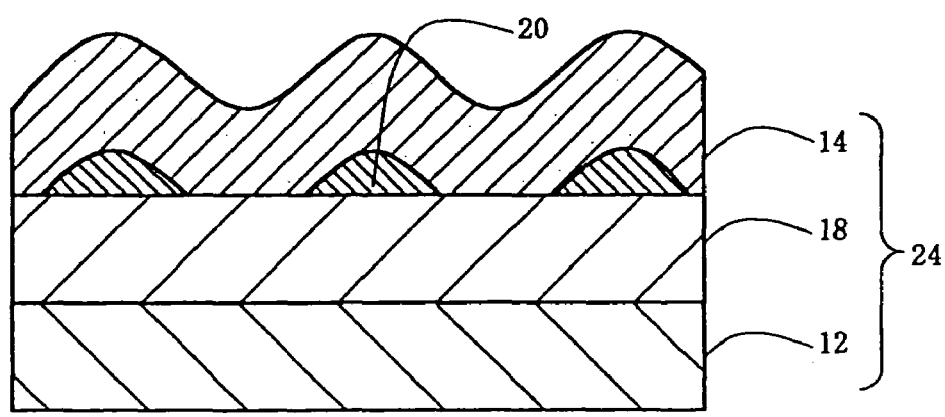
FIG. 2 is a sectional view of an example of the antireflection film laminate of the present invention comprising a hardcoat layer.

As a modified example of the first embodiment, also preferred is an antireflection film laminate 24 in which a hardcoat layer 18 is provided between the substrate 12 and the high refractive index film 20 which is a discontinuous layer, as shown in FIG. 2.

The second embodiment is a method for producing an antireflection film laminate, which comprises the step of forming a high refractive index film 20 (also referred to as the "second layer") as a discontinuous layer and the step of forming a low refractive index film 14 (also referred to as the "first layer") as a continuous layer on a substrate 12 in this order.

First Embodiment

The first embodiment is the antireflection film laminate 16 or 24 shown in FIG. 1 or 2 comprising the low refractive index film 14 on the surface side and the high refractive index film 20 disposed under the low refractive index film in contact therewith, in which the high refractive index film 20 is such a discontinuous layer that abase (substrate 12 or hardcoat layer 18) should be exposed.

1. Low Refractive Index Film (1) Curable Composition for Low Refractive Index Film Although the curable composition for low refractive index film is-not particularly limited, it is preferably constituted by, for example, the following components (a) to (d).

(a) Fluorine-containing copolymer having a hydroxyl group;
(b) Heat-curable agent having a functional group capable of reacting with a hydroxyl group;
(c) Curing catalyst; and
(d) Organic solvent.

(i) (a) Fluorine-Containing Copolymer having a Hydroxyl Group

As the component (a), any fluorine-containing copolymers having a hydroxyl group in the molecules may be preferably used. More specifically, the component (a) may be obtained by copolymerizing a monomer containing a fluorine atom with a monomer containing a hydroxyl group or an epoxy group. Further, it is also preferable to add an ethylenically unsaturated monomer other than the components (a) and (b), if necessary.

Examples of the monomer containing a fluorine atom include tetrafluoroethylene, hexafluoropropylene, vinylidene fluoride, chlorotrifluoroethylene, trifluoroethylene, tetrafluoroethylene, (fluoroalkyl)vinyl ethers, (fluoroalkoxyalkyl)vinyl ethers, perfluoro(alkylvinyl ethers), perfluoro(alkoxyvinyl ethers) and fluorine-containing (meth) acrylic acidesters, and combinations of two or more kinds of them.

Examples of the monomer containing a hydroxyl group or an epoxy group include hydroxyethyl vinyl ether, hydroxypropyl vinyl ether, hydroxybutyl vinyl ether, hydroxypentyl vinyl ether, hydroxyhexyl vinyl ether, hydroxyethyl allyl ether, hydroxybutyl allyl ether, glycerol monoallyl ether, allyl alcohol and hydroxyethyl (meth)acrylate and combinations of two or more kinds of them.

(ii) Heat-Curable Agent having a Functional Group Capable Of Reacting With A Hydroxyl Group As the heat-curable agent having a functional group capable of reacting with a hydroxyl group (hereinafter also referred to simply as a "heat-curable agent"), a melamine compound having two or more of methylol groups and alkoxymethyl groups or either one kind of these-groups are preferably used.

More specifically, methylated melamine compounds such as hexamethyl etherized methylol melamine compounds, hexabutyl etherized methylol melamine compounds, methylbutyl-mixed etherized methylol melamine compounds, methyl etherized methylol melamine compounds and butyl etherized methylol melamine compounds are more preferred.

The amount of the heat-curable agent is preferably in the range of 1 to 70 parts by weight with respect to 100 parts by weight of the fluorine-containing copolymer having a hydroxyl group.

This is because if the amount of the heat-curable agent is less than 1 part by weight, curing of the fluorine-containing copolymer having a hydroxyl group may become insufficient, whereas if the amount exceeds 70 parts by weight, the storage stability of the curable composition for low refractive index film may be degraded.

(iii) Curing Catalyst

As the curing catalyst, any of those promoting a reaction between the hydroxyl group-containing polymer and the curing agent may be preferably used. However, a curing catalyst similar to that used in a curable composition for high refractive index film is preferably used.

Although the amount of the curing catalyst is not particularly limited, the amount of the curing catalyst is preferably in the range of 0.1 to 30 parts by weight with respect to the total amount of the aforementioned fluorine-containing copolymer having a hydroxyl group and the heat-curable agent having a functional group capable of reacting with a hydroxyl group taken as 100 parts by weight.

This is because if the amount of the curing catalyst is less than 0.1 part by weight, the effect of the addition of the curing catalyst may not be obtained, whereas if the amount of the curing catalyst exceeds 30 parts by weight, the storage stability of the curing composition for low refractive index film may be degraded.

(iv) Organic Solvent

As the organic solvent used in the curable composition for low refractive index film, the same type as the organic solvent used for the curable composition for high refractive index film is preferably used.

The amount of the organic solvent is preferably in the range of 500 to 10,000 parts by weight with respect to 100 parts by weight of the fluorine-containing copolymer having a hydroxyl group.

This is because if the amount of such an organic solvent is less than 100 parts by weight, it may become difficult to form the low refractive index film with a uniform film thickness, whereas if the amount exceeds 10,000 parts by weight, the storage stability of the curable composition for low refractive index film may be degraded.

(2) Surface Roughness

The surface roughness of the low refractive index film, (R1, Rz according to JIS B0601) is preferably 2 µm or less.

This is because if this surface roughness (R1) exceeds 2 µm, the antiscratching property may be markedly degraded.

Therefore, the surface roughness (R1) of the low refractive index film is morepreferably 1.4 µm or less, still more preferably in the range of 0.02 to 1

(3) Refractive Index

The refractive index (refractive index for the Na-D line, measurement temperature: 25° C.) of the low refractive index film is more preferably in the range of 1.35 to 1.50.

This is because if the refractive index is less than 1.35, types of usable materials may be unduly limited, whereas if the refractive index exceeds 1.5, the antireflection effect may be degraded when the low refractive index film is used with the high refractive index film.

Therefore, the refractive index of the low refractive index film is more preferably in the range of 1.35 to 1.45, still more preferably in the range of 1.35 to 1.42.

Further, if the low refractive index film is provided, more superior antireflection effect can be obtained. The difference of the refractive indexes of the low refractive index film and the high refractive index film is preferably 0.05 or more. This is because if, the difference of the refractive indexes of the low refractive index film and the high refractive index film is less than 0.05, any synergetic effect of these antireflection films may not be obtained, and the antireflection effect may be degraded on the contrary.

Therefore, the difference of the refractive indexes of the low refractive index film and the high refractive index film is more preferably in the range of 0.1 to 0.5, still more preferably in the range of 0.15 to 0.5.

(4) Film Thickness

Although the film thickness of the low refractive index film is not also particularly limited, it is preferably in the range of, for example, 0.05 to 1 μm.

This is because if the film thickness of the low refractive index film is less than 0.05 μm, adhesion to the high refractive index film as a base and the antiscratching property may be degraded, whereas if the film thickness of the low refractive film exceeds 1 μm, it becomes difficult to form the low refractive index film as a uniform film, and in addition, light transmission and the antiscratching property may be degraded.

Therefore, the film thickness of the low refractive index film is more preferably in the range of 0.05 to 0.5 μm, still more preferably in the range of 0.05 to 0.3 μm.

Figure 6:
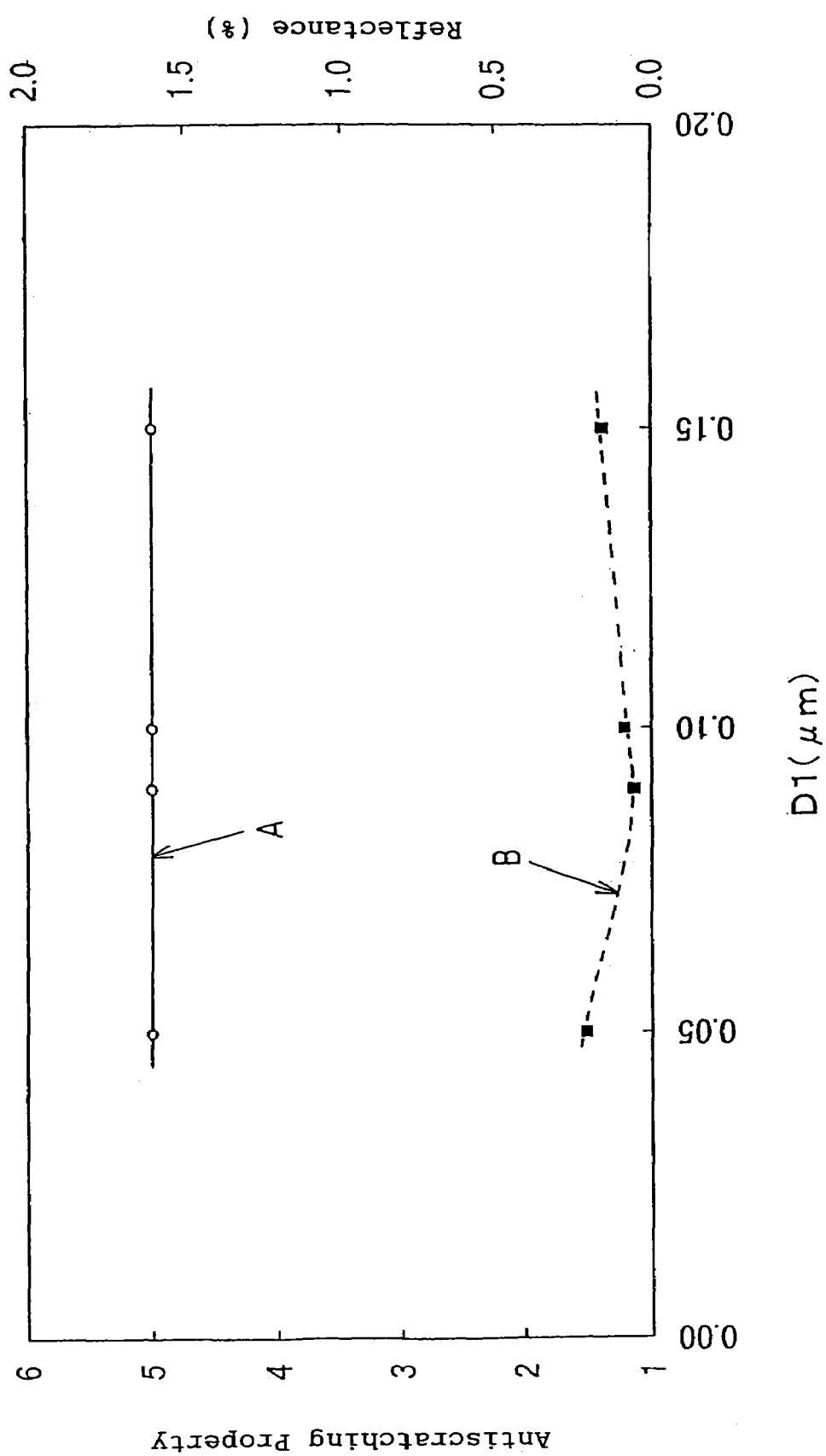
FIG. 6 is a graph provided for explanation of the influence of D1 in the antireflection film laminate.

For ease of understanding of such relationship, the relationship between the film thickness (D1), and the antiscratching property and reflective index of the low refractive index film is shown in FIG. 6.

The film thickness of the low refractive index film can be defined as, for example, an average of values (for ten points) measured on a transmission electron micrograph of a section. When the undersurface of the coated film is not flat, it is defined as an average distance between the lines in the roughness curve defined in JIS B0601 (measurement length: 1 μm).

High Refractive Index Film (1) Discontinuous Layer

The antireflection film laminate according to the first embodiment is characterized in that the high refractive index film is discontinuous in the planar direction.

That is, it is characterized in that the high refractive index film is not a uniform continuous layer, but has regions (portions) wherein a base (e.g., hardcoat layer) is exposed regularly or irregularly. Therefore, as described later, it may consists of high refractive index films in the shapes of separated islands, or it may be a high refractive index film consisting of a flat high refractive index film partially provided with openings such as holes or slits.

In any case, by employing the configuration described above, the high refractive index film can be readily formed as a film having unevenness on the surface or openings, and therefore a part of the high refractive index film can be entered into the low refractive index film to increase the contacting areas, of them. Therefore, movement of the low refractive index film can be restrained by the high refractive index film to markedly improve the antiscratching property of the low refractive index film.

The high refractive index film as a discontinuous layer is preferably formed in an island pattern. If a discontinuous high refractive index film regularly and flatly disposed is formed, extremely favorable control of the surface roughness (Rz) of the high refractive index film can be realized. Further, if such a high refractive index film in an island pattern is used, at least the peak portions of islands can sufficiently enter into the low refractive index film and thereby restrain the movement thereof to markedly improve the antiscratching property of the low refractive index film.

Figure 8:
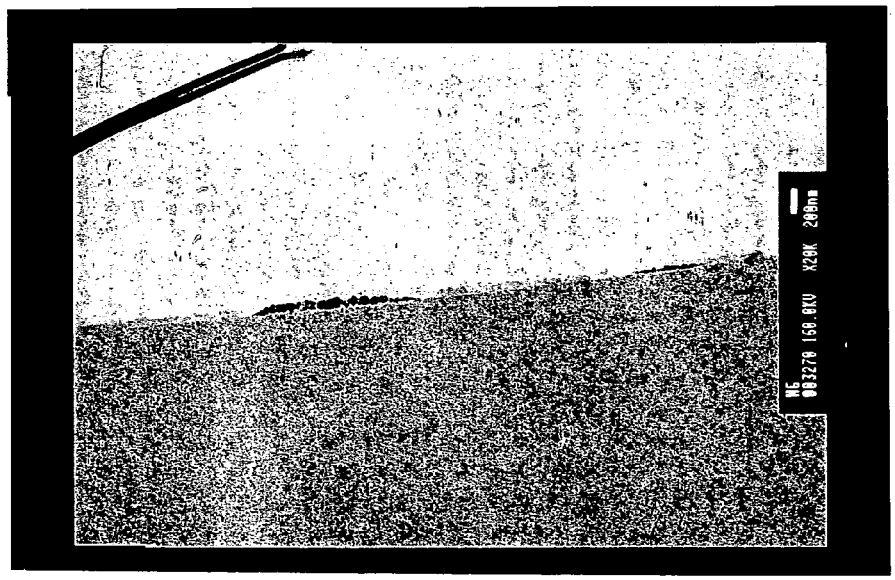
FIG. 8 is the first sectional photograph of a high refractive index film formed in an island pattern.
Figure 9:
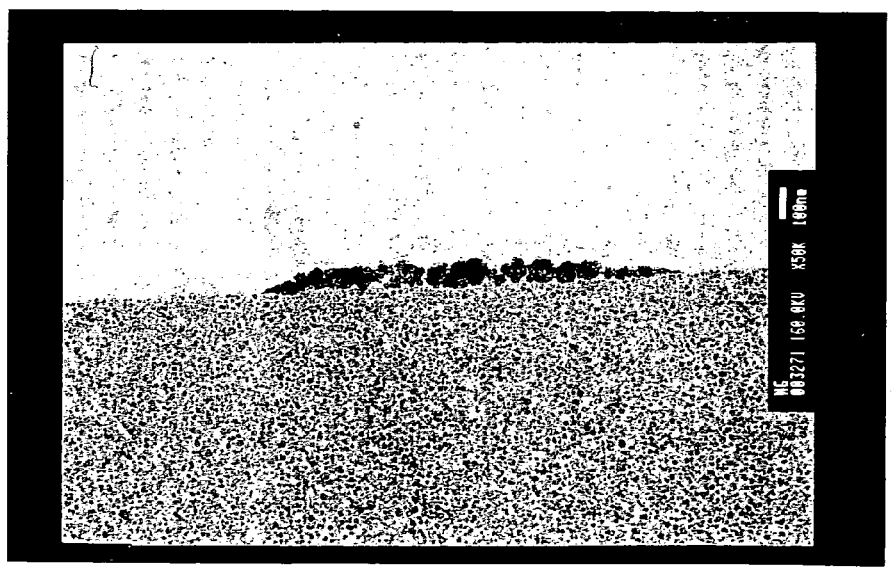
FIG. 9 is the second sectional photograph of a high refractive index film formed in an island pattern.
Figure 10:
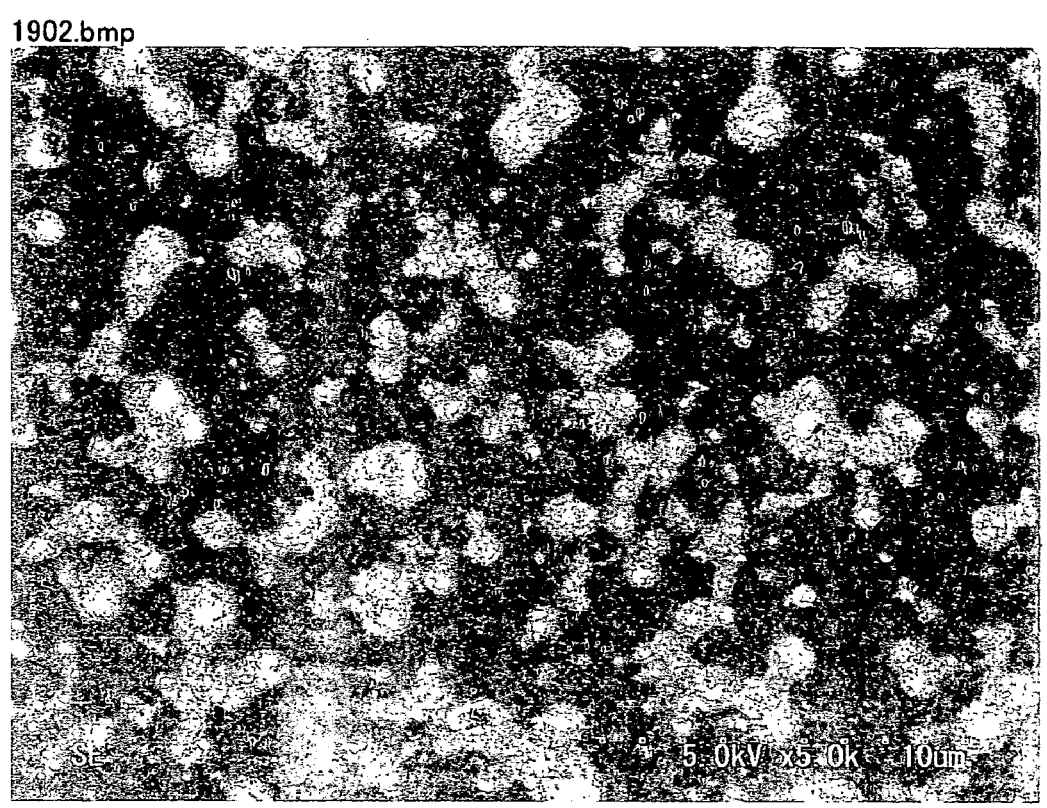
FIG. 10 is a plan photograph of a high refractive index film formed in an island pattern.

Exemplary photographs of sections of the high refractive index films formed in an island pattern are shown in FIGS. 8 and 9. The planar shape of each island of the high refractive index film in an island pattern may not be a circle, and it may be, for example, an irregular, shape formed by combined circles as shown in FIG. 10.

When the high refractive index film is formed in an island pattern, the average particle diameter is preferably in the range of 1 μm to 30 μm. This is because if the average particle diameter is less than 1 μm, it may become difficult to enter the high refractive index film into the low refractive index film and thereby increase the contacting area, whereas if the average particle diameter exceeds 30 mm, it may conversely become difficult to enter the high refractive index film into the low refractive index film, or the film thickness may become unduly large.

Further, when the high refractive index film is formed in an island pattern, the distance between centers of adjacent islands is not particularly limited. However, for example, it is preferably 30 mm or less, more preferably in the range of 1 μm to 20 mm, still more preferably in the range of 10 μm to 10 mm.

This is because if the distance between centers is less than 1 μm, it may become difficult to enter the high refractive index film into the low refractive index film to increase the contacting area, whereas if the distance between centers exceeds 30 mm, the force exerted by the high refractive index film to fix the low refractive index film is decreased, and thus the antiscratching property of the low refractive index film may not be improved.

Figure 11:
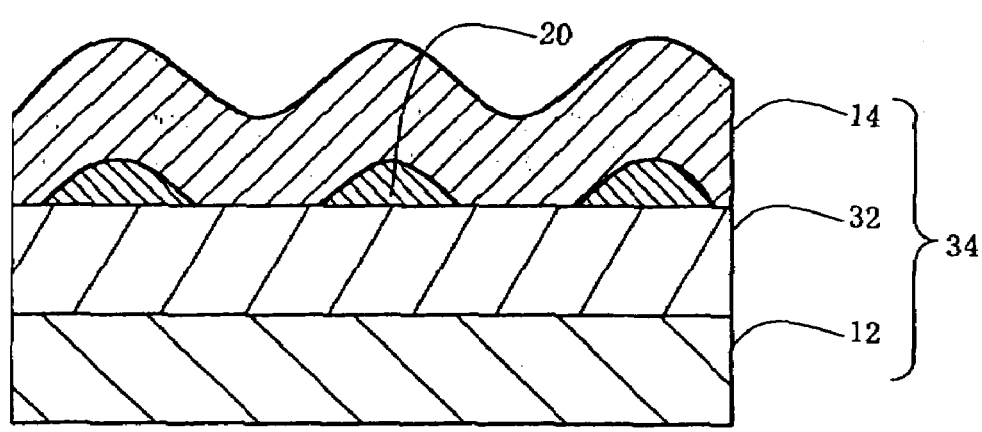
FIG. 11 is a sectional view of an example of the antireflection film laminate comprising a high refractive index film as a continuous layer.

In addition, although the high refractive index film in an island pattern (also referred to as the "first high refractive index film") is preferably formed directly on a substrate or a hardcoat layer, it is also preferable to further provide beforehand a high refractive, index film 32 (also referred to as the "second high refractive index film") as a continuous layer on the substrate 12 or hardcoat layer (not shown) and form a high refractive index film in an island pattern 20 (first high refractive index film) thereon, as shown in FIG. 11.

This is because the combination of the second high refractive index film as a continuous-layer and the first high refractive index film as a discontinuous layer inevitably provides contact of the low refractive index film with the high refractive index film (the first and second high refractive index films). That is, as compared with the case where only the high refractive index film in an island pattern (first high refractive index film) is used, more superior antireflection effect can be obtained.

(2) Composition 1 for High Refractive Index Film

Although the composition for high refractive index film for forming the high refractive index film is not particularly limited, it is preferably constituted by, for example, the components (A) to (G) mentioned below.

(A) Inorganic oxide particles having an average particle diameter of 0.1 μm or less
(B) Hydroxyl group-containing polymer
(C) Compound having both of a functional group capable of reacting with a hydroxyl group and a functional group capable of causing photopolymerization
(D) Photopolymerization initiator
(E) Acrylate compound
(F) Heat acid generating agent
(G) Organic Solvent (i) (A) Inorganic Oxide Particles The inorganic oxide particles as the component (A) preferably have an average particle diameter of 0.1 μm or less.

This is because if the average particle diameter of the inorganic oxide particles exceeds 0.1 μm, it becomes difficult to uniformly disperse the inorganic oxide particles in the antireflection film laminate, and the inorganic oxide particles become likely to precipitate in the composition for high refractive index film during the production, resulting in insufficient storage stability.

That is also because if the average particle diameter of inorganic oxide particles exceeds 0.1 μm, transparency of the obtained antireflection film may be degraded, or turbidity (haze value) of the obtained antireflection film may be increased.

Therefore, the average particle diameter of the inorganic oxide particles is more preferably 0.08 μm or less, still more preferably 0.05 μm or less.

The average particle diameter of the inorganic oxide particles is an average of particle diameters measured by using an electron microscope.

While the type of the inorganic oxide particles as the component (A) is preferably selected considering ease of control of refractive index, transparency etc., specific examples thereof include silicon oxide ($SiO_2$, 1.47), zirconium oxide ($ZrO_2$, refractive index: 2.05), tin oxide ($ZnO_2$, refractive index: 2.00), antimony-doped tin oxide (ATO, refractive index: 1.95), titanium oxide ($TiO_2$, refractive index: 2.3 to 2.7), zinc oxide (ZnO, refractive index: 1.90), tin-doped,ihdium oxide (ITO, refractive index: 1.95), cerium oxide (CeO, refractive index: 2.2), selenium oxide ($SeO_2$, refractive index 1.95), antimony oxide ($Sb_2O_5$, refractive index: 1.71), aluminum oxide ($Al_2O_3$, refractive index: 1.63), yttrium oxide ($Y_2O_3$, refractive index: 1.87), zinc antimonate (AZO, refractive index: 1.90) and so forth, and combinations of two or more kinds of these.

However, among these inorganic oxide particles, conductive metal oxide particles having a refractive index of 1.9 or more are preferably used, because such particles enable easy adjustment of the refractive index to 1.5 or more after curing with a relatively small addition amount, and can impart antistatic function. Specifically, it is preferable to use zirconium oxide, tin oxide, antimony/tin oxide, titanium oxide, zinc oxide, indium/tin oxide, selenium dioxide etc.

Further, the inorganic oxide particles are preferably subjected to a treatment with a coupling agent. This is because if the inorganic oxide particles are subjected to a treatment with a coupling agent, the binding force between the inorganic oxide particles in the high refractive index film can be increased, and as a result, the antiscratching property of the low refractive index film can be markedly improved. By carrying out such a treatment with a coupling agent as described above, it is also possible to improve dispersibility of the inorganic oxide particles and storage stability of the composition for high refractive index film during the production.

Preferred examples of the coupling agent used for performing the treatment with a coupling agent include compounds having an unsaturated double bond in the molecules such as γ-methacryloxypropyltrimethoxy-silane, γ-acryloxypropyltrimethoxysilane and vinyltrimethoxysilane, compounds having an epoxy group in the molecules such as γ-glycidoxypropyltriethoxy-silane and γ-glycidoxypropyltrimethoxysilane, compounds having an amino group in the molecules such as γ-aminopropyltriethoxysilane and γ-aminopropyl-trimethoxysilane, compounds having a mercapto group in the molecules such as γ-mercaptopropyltriethoxysilane and γ-mercaptopropyltrimethoxysilane, alkylsilanes such as methyltrimethoxysilane, methyltriethoxysilane and phenyltrimethoxysilane, tetrabutoxytitanium, tetrabutoxyzirconium, tetraisopropoxyaluminum and so forth, and combinations of two or more kinds of these.

Further, it is more preferable to use a coupling agent copolymerized or crosslinked with an organic compound. Examples of such a coupling agent include, for example, acrylic group-containing silane compounds obtained by reacting γ-mercaptopropyltrimethoxysilane, isophorone diisocyanate and pentaerythritol triacrylate so that they should be bound via thiourethane and urethane bonds.

The amount of the coupling agent used for the treatment is preferably 0.1 to 200 parts by weight, more preferably 1 to 100 parts by weight, still more preferably 5 to 50 parts by weight, with respect to 100 parts by weight of the inorganic oxide particles.

The content of the inorganic oxide particle as the component (A) is preferably in the range of 10 to 90% by volume with respect to the total volume of the composition.

This is because if the content of the inorganic oxide particle is less than 10% by volume, it may become difficult to adjust the surface roughness of the high refractive index film, and as a result, the antiscratching property of the low refractive index film may be degraded, whereas if the content of the inorganic oxide particles exceeds 90% by volume, mechanical strength of the high refractive index film may be degraded, and as a result, the antiscratching property of the low refractive index film may be degraded.

Therefore, the content of the inorganic oxide particles is more preferably in the range of 20 to 70% by volume, still more preferably in the range of 30 to 50% by volume.

(ii) (B) Hydroxyl Group-Containing Polymer

Any polymers having a hydroxyl group in the molecules can be suitably used as the component (B). Specific examples include polyvinyl acetal resins (polyvinyl butyral resin, polyvinyl formal resin), polyvinyl alcohol resins, polyacrylate, type resins, polyphenol type resins and phenoxy resins, and combinations of two or more kinds of these.

The amount of the component (B) is preferably in the range of 1 to 100 parts by weight with respect to 100 parts by weight of the inorganic oxide particles as the component (A). This is because if the amount of the component (B) is less than 1 part by weight, the adhesion of the obtained high refractive index film to the substrate may be degraded, whereas if the amount of the component (B) exceeds 100 parts by weight, the amount of inorganic oxide particles may relatively decreases, and thus adjustment of the refractive index of the antireflection film after curing may become difficult.

Therefore, the amount of the component (B) is preferably in the range of 3 to 70 parts by weight, more preferably in the range of 5 to 50 parts by weight, with respect to 100 parts by weight of the component (A).

(iii) (C) Compound having both of a Functional Group Capable of Reacting with a Hydroxyl Group and a Functional Group, Capable of Causing Photopolymerization The component (C) (henceforth also referred, to as the "compound having both types of groups") is preferably a compound having both of a functional group capable of reacting with a hydroxyl group (also referred to as a "hydroxyl group-reactive functional group") and a functional group capable of causing photopplymerization (also referred to as "photopolymerizable functional group").

By adding such a compound, it is possible to cause photocuring of the component (C) by using the photopolyinerizable functional group, and it is also possible to simultaneously react the component (C) and the component (B) by heating using the hydroxyl group reactive functional group and thereby form a stronger cured film.

Examples of the hydroxyl group-reactive functional group contained in the component (C) include, for example, an amino group, isocyanato group, carboxyl group, acid anhydride group, aldehyde group, halogen and so forth.

Examples of the photopolymerizable functional group similarly contained in the component (C) include, for example, an epoxy group, oxetane group, vinyl group and so forth.

As for both of these functional groups, it is preferred that one kind of each group or two or more kinds of each groups in combination should be contained in the compound.

Specific examples of the component (C) include t-butylaminoethyl acrylate, N,N-dimethylaminoethyl acrylate, N,N-diethylaminoethyl acrylate, N-methacryloxy-N, N-dicarboxymethyl-p-phenylenediamine, melamine/formaldehyde alkylmonoalcohol, 2-[o-(1'-methylpropylideneamino) carboxyamino]ethyl acrylate, 2,3-dibromopropyl acrylate, 2,3-dibromopropyl methacrylate, methacryloxyethyl phthalate, N-methacryloxy-N-carboxymethylpiperidine, 4-methacryloxyethyltrimellitic acid, acryloxyethyl terephthalate, ethylene oxide-modified phthalate/acrylate, ethylene oxide-modified succinate/acrylate, 4-methacryloxyethyltrimellitic anhydride, and so forth, and combination of two or more kinds of these.

The amount of the component (C) is preferably in the range of 10 to 300 parts by weight with respect to 100 parts by weight of the inorganic oxide particles of the component (A).

This is because if the amount of the component (C) is less than 10 parts by weight, curing of the hydroxyl group-containing polymer as the component (B) may become insufficient, whereas the amount of the component (C) exceeds 300 parts by weight, the refractive index of the high refractive index film to be obtained may be lowered.

Therefore, the amount of the component (C) is more preferably in the range of 20 to 200 parts by weight, still more preferably in the range of 50 to 150 parts by weight, with respect to 100 parts by weight of the component (A).

(iv) (D) Photopolymerization Initiator

Examples of the component (D) include photo-radical generators and photo-acid-generators. Although these components (D) can be used each alone, it is more preferable to use a photo-radical generator and a photo-acid generator together. This is because if a photo-radical generator and a photo-acid generator are used together, functional groups contained in the compound having both kinds of groups as the component (C) mentioned-above, for example, melamine/formaldehyde alkylmonoalcohol, can be more, reacted when the component (C) is used.

Although the amount of the component (D) is not also particularly limited, it is preferably in the range of, for example, 0.1 to 20 parts by weight with respect to 100 parts by weight of the component (C).

This is because if the amount of the component (D) is less than 0.1 part by weight curing of the component (C) may become insufficient, whereas if the amount of the component (D) exceeds 20 parts by weight, the storage stability of the curable composition for high refractive index film may be degraded.

Therefore, the amount of the component (D) is more preferably in the range of 0.5 to 10 parts by weight with respect to 100 parts by weight of the component (C).

(v) (E) Acrylate Compound

The component (E) is a (meth)acrylate compound other than the acrylate compounds as the component (C), and is a compound containing at least one (meth)acryloyl group in the molecule.

Therefore, the type thereof is not particularly limited, and it is, for example, a combination of a monofunctional (meth)acrylate compound and a multifunctional (meth)acrylate compound, or either one of these (meth)acrylate compounds. In particular, if a multifunctional (meth)acrylate compound is added, the reactivity of the curable composition for high refractive index film can be improved.

Although the amount of the component (E) is not particularly limited, either, it is preferably, for example, in the range of 0.01 to 1,000 parts by weight with respect to 100 parts by weight of the component (A).

This is because if the amount of the component (E) is less than 0.01 part by weight, the reactivity of the curable composition for high refractive index film may be degraded, whereas if the amount of the component (E) exceeds 1,000 parts by weight, the storage stability of the curable composition for high refractive index film may be degraded during the production.

Therefore, the amount of the component (E) within the range defined above allows uniform reaction, and thus the antiscratching property, solvent resistance, transparency and so forth of the obtained cured product become more favorable.

Accordingly, since the balance of the reactivity and storage stability etc. of the curable composition for high refractive index film becomes more favorable, the amount of the component (E) is more preferably in the range of 0.1 to 300 parts by weight, still more preferably in the range of 1 to 200 parts by weight, with respect to 100 parts by weight of the component (A).

(vi) (F) Curing Catalyst

Examples of the component (F) include aliphatic sulfonic acids, aliphatic sulfonic acid salts, aliphatic carboxylic acids, aliphatic carboxylic acid salts, aromatic sulfonic acids, aromatic sulfonic acid salts, aromatic carboxylic acids, aromatic carboxylic acid salts, metal salts, phosphoric acid esters and so forth, and combinations of two or more kinds of them.

Although the amount of the curing catalyst as the component (F) is not particularly limited either, the amount of the curing catalyst is preferably in the range of 0.1 to 30 parts by weight with respect to the total weight of the component (B) and the component (C) taken as 100 parts by weight.

This is because if the amount of the curing catalyst is less than 0.1 part by weight, the effect of the addition of the curing catalyst may not be exerted, whereas if the amount of the curing catalyst exceeds 30 parts by weight, the storage stability of the curable composition for high refractive index film may be degraded.

Therefore, the amount of the curing catalyst is more preferably in the range of 0.5 to 20 parts by weight, more preferably in the range of 1 to 10 parts by weight.

(vii) (G) Organic Solvent

In the curable resin composition, at least one kind of organic solvent chosen from the group consisting of methyl ethyl ketone (MEK), methyl isobutyl ketone (MIBK), cyclohexanone, n-butanol, ethylcellosolve, ethyl lactate (EL), diacetone alcohol (DAA), propylene glycol monomethyl ether (PGME), acetylacetone (AcAc) and ethyl acetoacetate (EAcAc) is preferably used.

This is because if such an organic solvent is used, it becomes easy to control the surface roughness (Rz) of the high refractive index film during formation of the high refractive index film from the curable composition for high refractive index film.

Further, it is also preferable to use a mixed solvent consisting of an alcohol type solvent and a ketone type solvent as the component (G). This is because it makes handling property of the curable composition for high refractive index film favorable, and moreover, it provides superior antireflection property and transparency of the obtained high refractive index film.

Although the amount of the component (G) is not particularly limited either, the amount of organic solvent is preferably in the range of 50 to 20,000 parts by weight with respect to 100 parts by weight of the inorganic oxide particles as the component (A).

This is because if the amount of the component (G) is less than 50 parts by weight, adjustment of viscosity of the curable composition for high refractive index film may become difficult, whereas if the amount of the component (F) exceeds 20,000 parts by weight, viscosity of the curable composition for high refractive index film may be unduly reduced, and thus handling thereof may become difficult.

Therefore, the amount of the component (G) is more preferably in the range of 100 to 10,000 parts by weight, still more preferably in the range of 200 to 5,000 parts by weight, with respect to 100 parts by weight of the component (A).

(viii) Additives

The curable composition for high refractive index film preferably further contain additives such as photosensitizers, polymerization inhibitors, polymerization initiation aids, leveling agents, wettablility improvers, surfactants, plasticizers, ultraviolet absorbers, antioxidants antistatic agents, silane coupling agents, inorganic fillers, pigments and dyes, so long as the object or effect of the present invention is not degraded.

(2) Curable Composition 2 for High Refractive Index Film

As another curable composition for high, refractive index film forming the high refractive index film, a curable composition obtained by reacting the following (a-1) and (a-2) in an organic solvent is also preferred.

(a-1) Conductive metal oxide particle having a primary particle diameter of 0.1 μm or less and a powder resistance of 100 Ω·cm or less (a-2) Alkoxysilane compound having a urethane bond [—O—C(=O)NH—] and a thiourethane bond [—S—C (=O)NH—]. or either one of these urethane bonds, and an unsaturated double bond in the molecule.

Such a curable composition for high refractive index film enables formation of a high refractive index applied film (coated film) exhibiting superior antistatic property, transparency, hardness, antiscratching property and adhesion.

(3) Surface Roughness (R2)

The surface roughness of the high refractive index film R2 (Rz according to JIS B060.1) is preferably in the range of 0.01 to 2 μm.

This is because if this surface roughness R2 is less than 0.01 μm, the ratio of the high refractive index film entering into the low refractive index film may decrease, which makes it difficult to restrain the low refractive index film as a result, and thus the antiscratching property of the low refractive index film may be degraded.

Further, that is also because if R2 exceeds 2 μm. the surface roughness of the low refractive index film becomes relatively large so that light scattering should become likely to occur, and as a result, reflectance and transparency may be degraded.

Therefore, the surface roughness R2 of the high refractive index film is preferably in the range of 0.02 to 1 μm, more preferably in the range of 0.05 to 0.5 μm.

(4) Refractive Index

The refractive index (refractive index for the Na-D line, .measurement temperature: 25° C.) of the high refractive index film is preferably in the range of 1.45 to 2.1.

This is because if the refractive index is less than 1.45, the antireflection effect may be markedly degraded when the high refractive index film is combined with the low refractive index film, whereas if the refractive index exceeds 2.1, usable materials may be unduly limited.

Therefore, the refractive index of the low refractive index film is more preferably in the range of 1.55 to 2.0, still more preferably in the range of 1.6 to 1.9.

(5) Film Thickness

Although the film thickness of the high refractive index film is not also particularly limited, it is preferably in the range of, for example, 50 to 30,000 nm.

This is because if the film thickness of the high refractive index film is less than 50 nm, antireflection effect and adhesion to the substrate may be degraded when the high refractive index film is combined with the low refractive index film, whereas if the film thickness of the high refractive index film exceeds 30,000 nm, it may become difficult to form the discontinuous high refractive index film as a uniform film.

Therefore, the film thickness of the high refractive index film is more preferably in the range of 50 to 1,000 nm, still more preferably in the range of 60 to 500 nm.

The film thickness of the high refractive index film can be defined as, for example, an average of values measured (for ten points) on a transmission electron micrograph of a section, as in the low refractive index film. When the undersurface of the coated film is not flat, it is defined as an average distance between the lines in the roughness curve defined in JIS B0601 (measurement length: 1 μm).

Further, when the flat high refractive index film is formed as a discontinuous layer in which holes, slits or the like are formed in a part thereof, and which has substantially flat lower surface and upper surface, the film thickness of such a high refractive index film means a distance from the lower surface to the upper surface in the perpendicular direction (height of section).

3. Ratio of R1/D1

When the surface roughness of the low refractive index film is represented by R1, and the film thickness of the low refractive index film is represented by D1, R1/D1 is preferably in the range of 0.01 to 2.

This is because if the ratio of R1/D1 is less than 0.01, the film thickness of the low refractive index film becomes relatively thicker, and thus the effect of the surface roughness of the high refractive, index film is not exerted, which may result in marked degradation of the antiscratching property. Further, that is also, because if the ratio of R1/D1 exceeds 2, the surface roughness of the low refractive index film becomes relatively large, and thus light scattering becomes likely to occur, which may result in degradation of reflectance and transparency.

Therefore, the ratio of R1/D1 is preferably in the range of 0.014 to 1, more preferably in the range of 0.014 to 0.8.

The above discussion will be explained in more detail with reference to FIG. 3.

Figure 3:
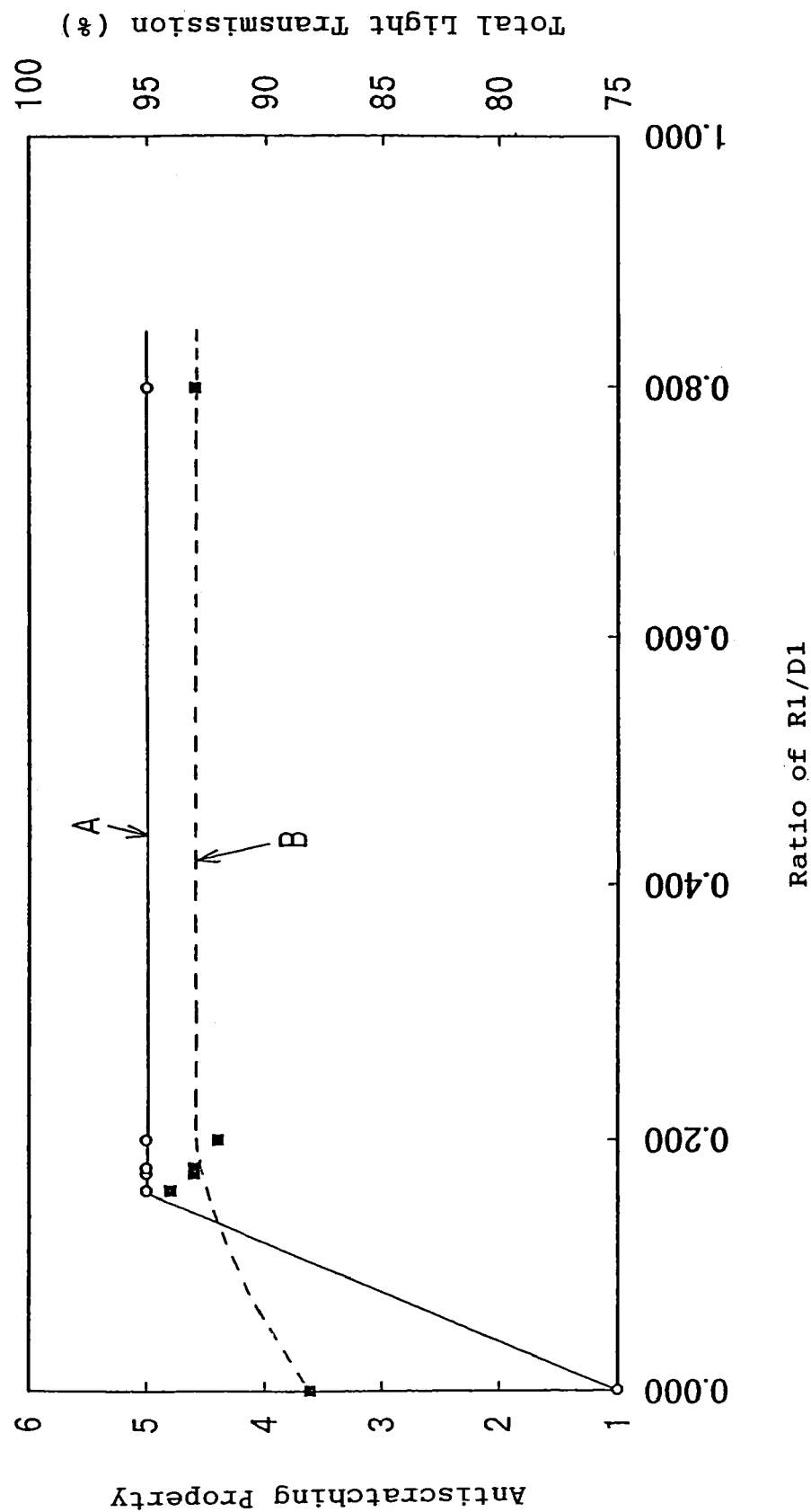
FIG. 3 is a graph provided for explanation of the influence of R1/D1 in the antireflection film laminate.

In FIG. 3, plotting was made with the ratio of R1/D1 as abscissa against evaluation score of antiscratching property as left ordinate and value of total light transmission (%) as right ordinate.

In FIG. 3, the curve A represents change of the antiscratching property, and it can be understood that a larger ratio of R1/D1 more improves the evaluation score of antiscratching property when the ratio is in the range of 0 to 0.16. Further, it can also be understood that if the ratio of R1/D1 is 0.1 or more, antiscratching property indicated with an evaluation score of 3 or more, i.e., in the acceptable range, can be obtained. On the other hand, when the ratio of R1/D1 is in the range of 0.16 to 0.8, the evaluation score of the antiscratching property is 5 for all the cases, Therefore, it can be understood that superior antiscratching property can be stably obtained by selecting the ratio of R1/D1 so as to be 0.16 or more.

In FIG. 3, the curve B represents change of the total light transmission, and it can be understood that it changes with the substantially same tendency as that of the evaluation of antiscratching property.

However, there is observed a tendency that the light transmission slightly decreases when the ratio gof. R1/D1 exceeds 0.2 but 0.8 or less, as compared with the light transmission observed when the ratio of R1/D1 is 0.16 to 0.2. It is considered that this was caused because the surface roughness of the low refractive index film became relatively larger as the ratio of R1/D1 became larger, and thus light scattering became more likely to occur.

Figure 4:
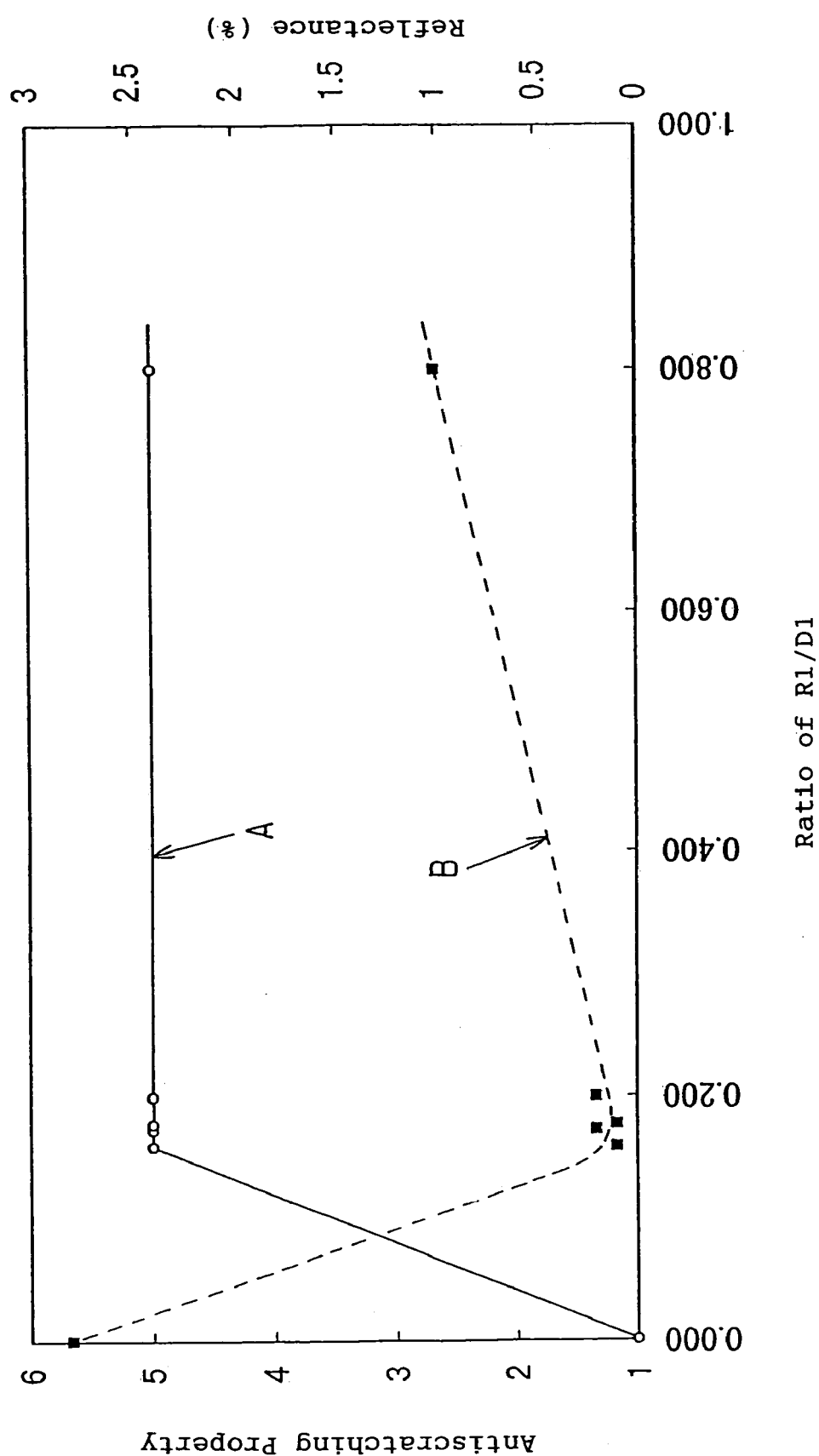
FIG. 4 is the first graph provided for explanation of the influence of R1/D1 in the antireflection film laminate.

In FIG. 4, the curve B represents the relationship between the ratio of R1/D1 and the reflectance. When the ratio of R1/D1 is 0.12 or less, the value of reflectance becomes larger, and when the ratio of R1/D1 becomes about 0.8, the value of reflectance becomes slightly larger again. It is considered that this suggests the influence of light scattering. Therefore, it can be understood that the results shown in FIG. 4 conform to the results shown in FIG. 3.

4. R1/R2

Further, in the first embodiment, when the surface roughness of the low refractive index film is represented by R1, and the surface roughness of the high refractive index film is represented by R2, the ratio of R1/R2 is preferably in the range of 0.05 to 1.

This is because if the ratio of R1/R2 is less than 0.05, the effect of the surface roughness of the high refractive index film with respect to the low refractive index film is not exerted, and thus the antiscratching property is markedly degraded. Further, that is also because if the ratio of R1/R2 exceeds 1, the surface roughness of the low refractive index film becomes relatively large, and thus light scattering becomes likely to occur, which may result in degradation of reflectance and transparency.

Therefore, the ratio of R1/R2 is preferably in the range of 0.1 to 1, more preferably in the range of 0.2 to 1.

The above discussion will be explained in more detail with reference to FIG. 5.

Figure 5:
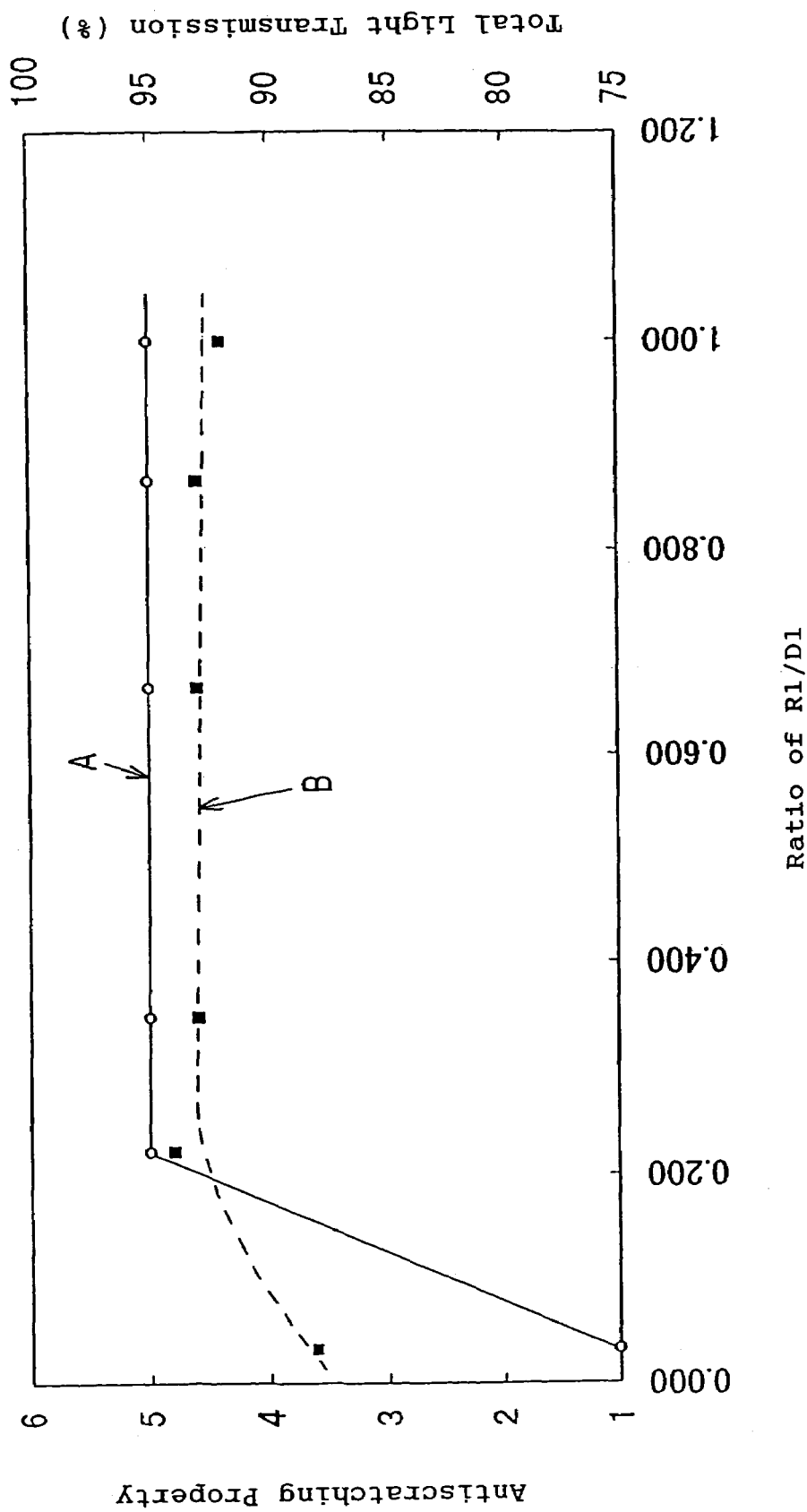
FIG. 5 is the second graph provided for explanation of the influence of R1/R2 in the antireflection film laminate.

In FIG. 5, plotting was made with the ratio of R1/R2 as abscissa against evaluation score of antiscratching property as left ordinate and value of total light transmission (%) as right ordinate.

In FIG. 5, the curve A represents change of the antiscratching property, and it can be understood that as the ratio of R1/R2 becomes larger, the evaluation score of antiscratching property is more improved when the ratio is in the range of 0 to 0.2. Further, it can also be understood that if the ratio of R1/R2 is in the range of 0.2 to 1, the evaluation score of the antiscratching property is 5 for substantially all of the cases. Therefore, it can be understood that superior antiscratching property can be stably obtained by selecting the ratio of R1/R2 to be 0.2 or more.

Further, in FIG. 5, the curve B represents change of the total light transmission, and it can be understood that it changes with the substantially same tendency as that of the evaluation of antiscratching property.

However, there is observed a tendency that the total light transmission slightly decreases when the ratio of R1/R2 is in the range of 0.8 to 1, as compared with the total light transmission observed when the ratio of R1/R2 is 0.2 or more but less than 0.8. It is considered that this was caused because the surface roughness of the low refractive index film became relatively larger as the ratio of R1/R2 became larger, and thus light scattering became more likely to occur.

5. R2/D1

Further, in the first embodiment, when the surface roughness of the high refractive index film is represented by R2, and the film thickness of the low refractive index film is represented by D1, the ratio of R2/D1 is preferably in the range of 0.06 to 2.

This is because if the ratio-of R2/D1 is less than 0.06, the effect of the surface roughness of the high refractive index film with respect to the low refractive index film is not exerted and thus the antiscratching property is markedly degraded. Further, that is also because if the ratio of R2/D1 exceeds 2, the surface roughness of the low refractive index film becomes relatively large, and thus light scattering becomes likely to occur, which may result in degradation of reflectance and transparency.

Therefore, the ratio of R2/D1 is preferably in the range of 0.2 to 2, more preferably in the range of 0.4 to 2.

The above discussion will be explained in more detail with reference to FIG. 7.

Figure 7:
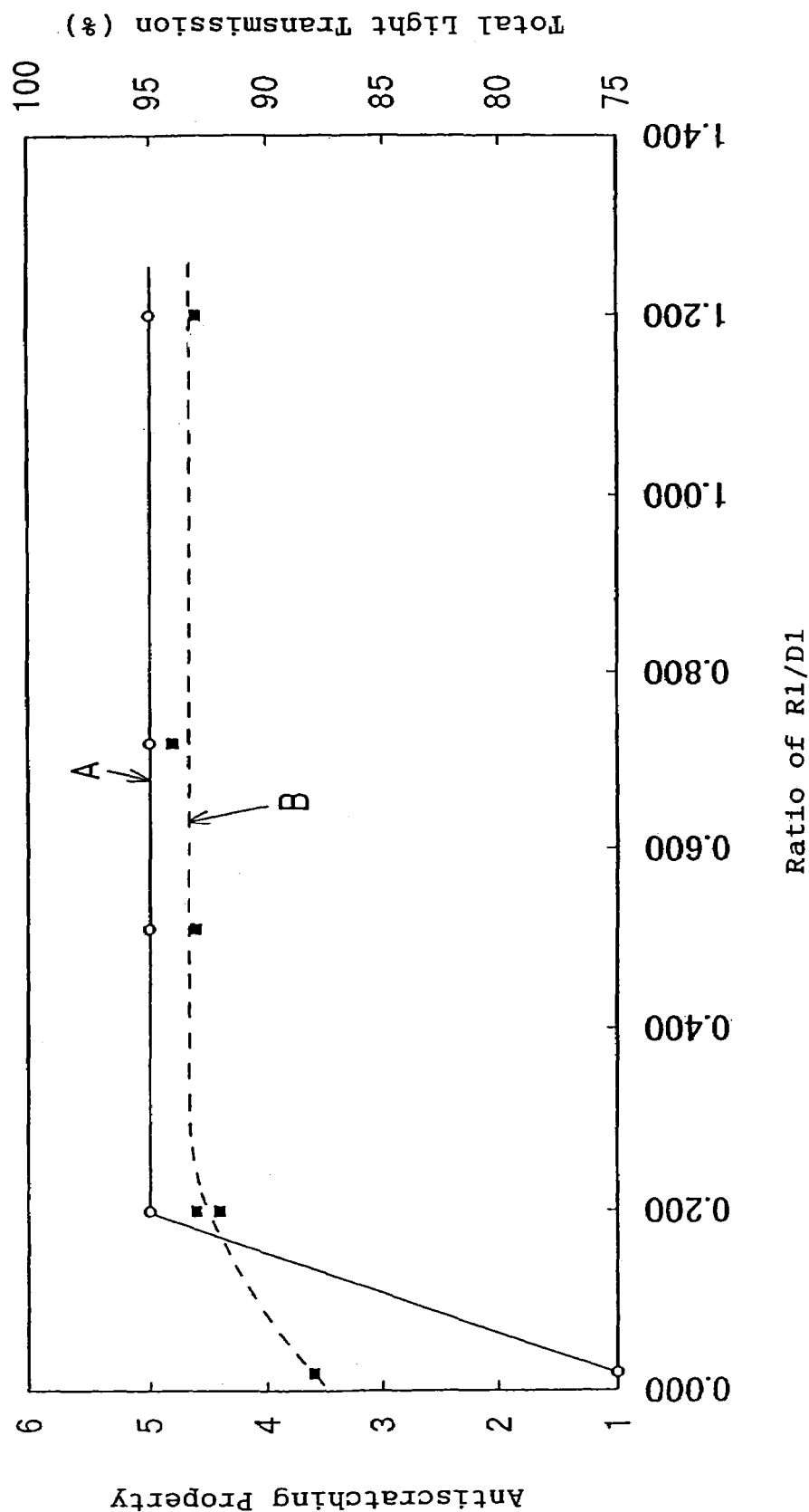
FIG. 7 is a graph provided for explanation of the influence of R2/D1 in the antireflection film laminate.

In FIG. 7, plotting was made with the ratio of R2/R1 as abscissa against evaluation score of antiscratching property as left ordinate and value of total light transmission (%) as right ordinate.

In FIG. 7, the curve A represents change of the antiscratching property, and it can be understood that as the ratio of R2/D1 becomes larger, the evaluation score of antiscratching property is markedly improved when the ratio is in the range of 0 to 0.2. Further, if the ratio of R2/D1 is in the range of 0.2 to 1.2, the evaluation score of the antiscratching property is 5 for substantially all of the cases. Therefore, it can be understood that superior antiscratching property can be stably obtained by selecting the ratio of R2/D1 so as to be 0.2 or more.

Further, in FIG. 7, the curve B represents change of the total light transmission, and it can be understood that it changes with the substantially same tendency as that of the evaluation of antiscratching property.

6. Hardcoat Layer

In the first embodiment, it is also preferable to provide a hardcoat layer (also referred to as the "third layer") under the high refractive index film (also referred to as the "second layer").

By providing a hardcoat layer as described above, the high refractive index film can be firmly fixed. Therefore, the antiscratching property can be more improved also for the low refractive index film (also referred to as the "first layer") into which the high refractive index film enters.

Although the material constituting the hardcoat layer is not particularly limited either, examples of the material include siloxane resins, acrylic resins, melamine resins, epoxy resins and so forth, and combinations of two or more kinds of these.

Among these resins, examples of the materials having high hardness and capable of more improving the antiscratching property of the low refractive index film include heat-curable type hardcoat materials obtained by reacting an alkylalkoxysilane with colloidal silica in a hydrophilic solvent as described in JP-A-63-117074, ultraviolet-curable type hardcoat materials in which reactive silica particles are dispersed as described in JP-A-9-100111 and ultraviolet-curable type hardcoat materials comprising a urethane acrylate and a polyfunctional acrylate as main components.

The film thickness of the hardcoat layer is preferably in the range of 0.1 to 50 μm.

This is because if the film thickness of the hardcoat layer is less than 0.1 μm, it may become difficult to firmly fix the low refractive index film, whereas if the film thickness exceeds 50 μm, the production of the hardcoat layer may become difficult, and the bending property may be degraded when the antireflection film is used for film applications.

Therefore, the film thickness of the high refractive index film is more preferably in the range of 0.5 to 30 μm, still more preferably in the range of 1 to 20 μm.

7. Intermediate Layer

In the first embodiment, it is also preferable to provide an intermediate layer having a refractive index larger than the refractive index of the low refractive index film and the same as or smaller than the refractive index of the high refractive index film between the low refractive index film and the high refractive index film.

If such a configuration is employed, the surface unevenness of the high refractive index film as a discontinuous layer can be accurately controlled, and as a result, the antiscratching property of the low refractive index film can be more improved. Further, since the refractive index of the intermediate layer is linked with the refractive indexes of the low refractive index film and the high refractive index film, the antireflection effect can also be further improved.

The intermediate layer may be a continuous layer like the low refractive index film, or may be a discontinuous layer like the high refractive index film.

For example, when the intermediate layer is formed as a continuous layer like the high refractive index film, the surface unevenness of the low refractive index film formed on it can be controlled more accurately. Further, when the intermediate layer is formed as a discontinuous layer, the adhesion force between the low refractive index film and the high refractive index film can be more improved.

The thickness of the intermediate layer is preferably in the range of 0.01 to 30 μm.

This is because if the film thickness of the intermediate layer is less than 0.01 μm, improvement of the adhesive force between the low refractive index film and the high refractive index film may not be attained, whereas if the film thickness of the, intermediate layer exceeds 30 μm, the invasive property of the high refractive index film into the low refractive index film is degraded, and thus it may become difficult to firmly fix and thereby restrain the low refractive index film.

Therefore, the film thickness of the intermediate layer is more preferably in the range of 0.02 to 20 μm, still more preferably in the range of 0.05 to 10 μm.

The intermediate layer is preferably constituted with a curable composition prepared based on the curable composition for low refractive index film mentioned above, or a curable composition prepared based on the curable composition for high refractive index film mentioned above. When the curable composition for low refractive index film is used as a base, high refraction index particles or the like can be added to the curable composition for low refractive index film to prepare a curable composition for intermediate layer. When the curable composition for high refractive index film is used as a base, a low refraction index resin or the like can be added to the curable composition for high refractive index film to prepare a curable composition for intermediate layer.

8. Substrate

Hereafter, the substrate on which the high refractive index film or hardcoat layer or the like, is necessary, is provided will be explained.

Although the type of the substrate is not particularly limited, examples include substrates comprising a polyester resin, triacetyl cellulose resin, polycarbonate resin, allyl carbonate resin, polyether sulfone resin, polyacrylate resin, norbornene resin, acrylstyrene resin or glass.

For example, if the antireflection film laminate is prepared to contain these substrates, not only antireflection effect, but also superior antiscratching property and transparency can be obtained, and in addition, high mechanical strength and durability can be obtained, in a wide range of application fields of antireflection films such as lens portions of cameras, image displays of televisions (CRT) and color filters of liquid crystal display devices.

Second Embodiment

The embodiment of the present invention concerning a method for producing an antireflection film laminate targets such an antireflection film laminate 16 or 24 as shown in FIG. 1 or 2, and it concerns a method for producing an antireflection film laminate comprising a low refractive index film 14 on the surface side and a high refractive index film 20 disposed under the low refractive index film in contact therewith, and characterized by comprising the following steps of forming the high refractive index film 20 which is a discontinuous layer and forming the low refractive index film 14 which is a continuous layer on the high refractive index film:

(1) the step of forming the high refractive index film having are fractive index larger than that of the low refractive index film and in the range of 1.45 to 2.1 as a discontinuous layer in the planar direction, and (2) the step of forming the low refractive index film having a refractive index in the range of 1.35 to 1.5.

1. The Step of Forming the High Refractive Index Film as Discontinuous Layer.

(1) Formation Method 1.

In the step of forming the high refractive index, film which is a discontinuous layer, it is preferable to partially apply (coat) a curable composition for high refractive index film on a substrate to form a discontinuous coated film (including a film in an island pattern).

Although the coating method is not particularly limited, for example, coating methods including a dipping method, spraying method, bar coating method, roll coating method, spin coating method, curtain coating method, gravure coating method, silk screen method, ink jet method and so forth may be used.

Figure 12A:
FIG. 12 is the first production flowchart for an example of the antireflection film laminate.
Figure 12B:
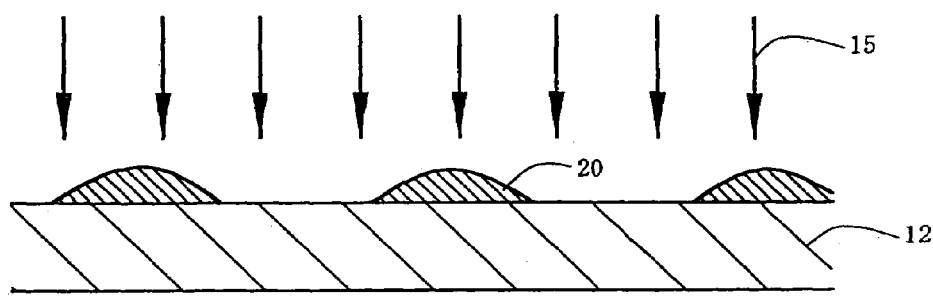
Figure 12C:
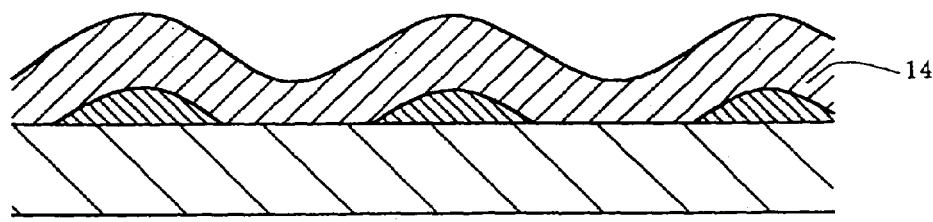

Then, in the step of forming a discontinuous high refractive index film, the coated film consisting of the curable composition for high refractive index film is preferably irradiated with an ultraviolet ray or electron beam 15 and thereby photocured, as shown in FIG. 12. An example of the production process utilizing such photocuring is shown in FIGS. 12(a) to (c).

FIG. 12(a) shows a stage that a substrate 12 is prepared, and FIG. 12(b) shows a state that the curable composition for high refractive index film is partially applied on the substrate 12 to form a discontinuous coated film (including films coated in an island pattern), and then the coated film is irradiated with ultraviolet ray or electron beam 15 and thereby cured.

FIG. 12(c) shows a state that after the coated film for the high refractive index film is cured to form the high refractive index film 20, the low refractive index film 14 is formed on the formed high refractive index film 20.

In the above process, it is preferable to use, for example, an ultraviolet irradiation apparatus (metal halide ramp etc.) with an irradiation condition of 0.001 to 10 J/cm$^2$.

This is because such an irradiation condition provides a sufficiently cured high refractive index film and in addition, does not unduly prolong the production time.

Therefore, the irradiation condition is more preferably 0.01 to 5 J/cm$^2$, still more preferably 0.1 to 3 J/cm$^2$.

(2) Formation Method 2

Further, in the step of forming a discontinuous high refractive index film, it is preferable to apply a curable composition for high refractive index film many times. This is because, as for formation of a high refractive index film of the same thickness, if the film is formed by application of one time, the inorganic oxide particles may be more likely to precipitate in the film compared with application, of multiple times, and thus it may become difficult to form surface unevenness.

That is, by applying the curable composition for high refractive index film many times, it becomes easy, to protrude or expose the inorganic oxide particles on the surface, and therefore unevenness can be formed on the high refractive index film surface with good precision.

Therefore, for example, when a discontinuous high refractive index film having a film thickness of 0.3 μm is formed, the curable composition for high refractive index film is preferably coated three times each for a thickness of 0.1 μm, not coated one time. It is also preferable to form a comparatively thick discontinuous high refractive index film having a film thickness of 0.25 μm beforehand and then form a comparatively thin discontinuous high refractive index film having a film thickness of 0.5 μm thereon.

(3) Formation Method 3

Further, in the step of forming a discontinuous high refractive index film, the high refractive index film is preferably formed in a comparatively regular island pattern.

By forming the high refractive index film in an island pattern as described above, the surface roughness (Rz) of the high refractive index film can be extremely favorably controlled. Further, if such a high refractive index film formed in an island pattern is used, peak portions thereof can sufficiently enter into the low, refractive index film, and thereby movement of the low refractive index film can be restrained to markedly improve the antiscratching property.

The high refractive index film in an island pattern can also be formed by partially coating the high refractive index film using a printing method or silk screen method. Alternatively, even if a bar coater or roll coater method is used, a high refractive index film in an island pattern can be easily formed by forming a comparatively thin film.

Such a high refractive index film in an island pattern can also be formed by forming a uniform high refractive index film beforehand and then removing portions corresponding to the so called sea using polishing means, embossing means or the like.

(4) Formation Method 4

Further, in the step of forming a discontinuous high refractive index film, the high refractive index film is preferably cured with a ultraviolet ray, electron beam or heat in a state that a film having releasability and surface unevenness or holes is laminated on the high refractive index film (also referred to as the "film pressing method"). An example of the production process utilizing such a film 11 is shown in FIGS. 13(a) to (d).

Figure 13A:
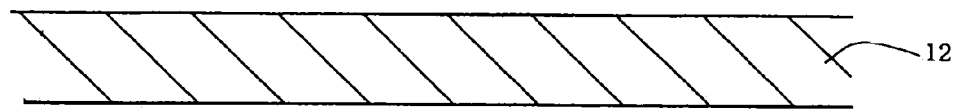
FIG. 13 is the second production flowchart for an example of the antireflection film laminate.
Figure 13B:
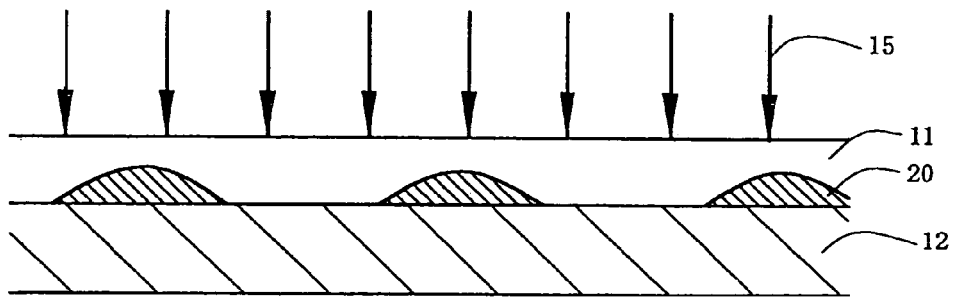

FIG. 13(a) shows a stage that a substrate 12 is prepared, and FIG. 13(b) shows a state that the curable composition for high refractive index film is applied on the substrate 12, and then the coated film is cured with an ultraviolet ray or electron beam while pressing a film having surface unevenness.

Figure 13C:
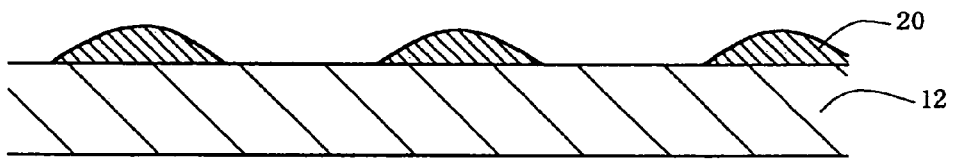
Figure 13D:
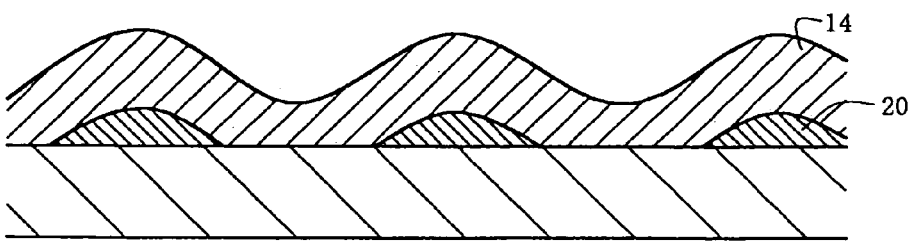

Further, FIG. 13(c) shows a state that the film is delaminated after curing of the coated film for high refractive index film, and FIG. 13(d) shows a the state that the low refractive index film 14 is formed on the formed high refractive index film 20.

If the coated film of the high refractive index films is cured while the film all is laminated as described above, the high refractive index film 20 can be formed as a discontinuous layer, and the surface unevenness of the film can be transferred to the surface of the high refractive index film 20 with good precision. Further, by curing the high refractive index film 20 with the film 11 having the surface unevenness as described above, number of protruding and indenting portions per unit area, size of islands etc. of the high refractive index film can also be easily controlled.

In order to transfer the surface unevenness on the film with good precision, the surface roughness (Rz according to JIS B0601) of the film, which is represented by R3, is preferably in the range of 0.01 to 2 μm.

Further, if the film has releasability, it can be easily removed after the curing of the high refractive index film. Therefore, the film is preferably constituted with a releasable resin such as a fluororesin or silicone resin.

(5) Formation Method 5

Further, in the step of forming a discontinuous high refractive index film, after, before or during the curing of the high refractive index film with an ultraviolet ray electron beam or heat, the high refractive index film is preferably subjected to a embossing treatment (including matting treatment). An example of the production process including such an embossing treatment is shown in FIGS. 14(a) to (d).

Figure 14A:
FIG. 14 is the third production flowchart for an example of the antireflection film laminate.
Figure 14B:
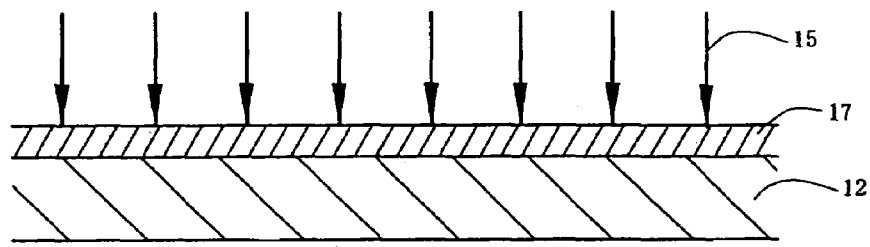

FIG. 14(a) shows a stage that a substrate 12 is prepared, and FIG. 14(b) shows a state that after the curable composition for high refractive index film is coated on the substrate 12, the coated film 17 is cured by irradiation with an ultraviolet ray or electron beam.

Figure 14C:
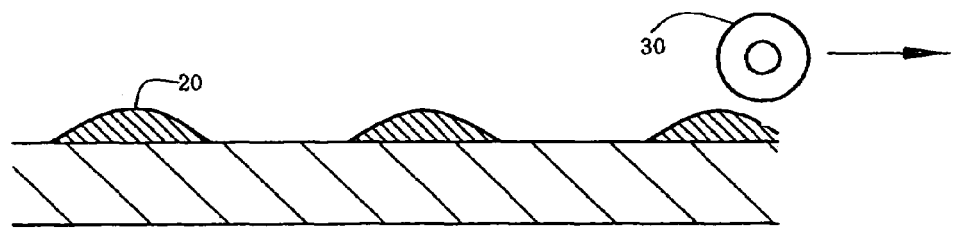
Figure 14D:
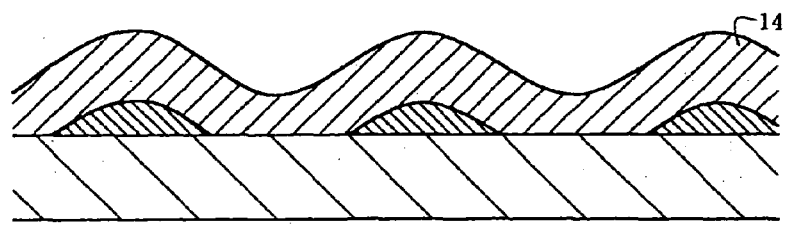
Figure 15A:
FIG. 15 is the fourth production flowchart for an example of the antireflection film laminate.
Figure 15B:
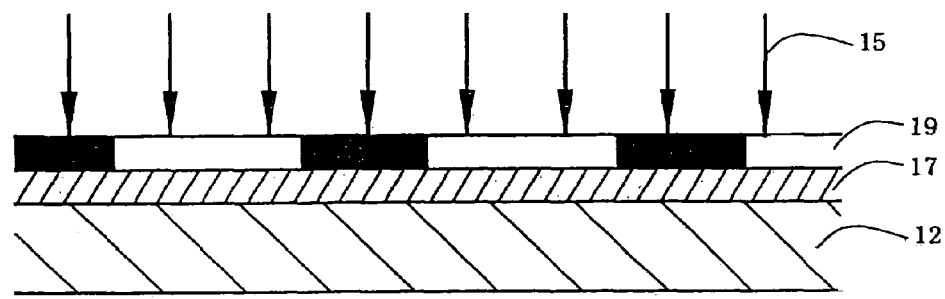
Figure 15C:
Figure 15D:
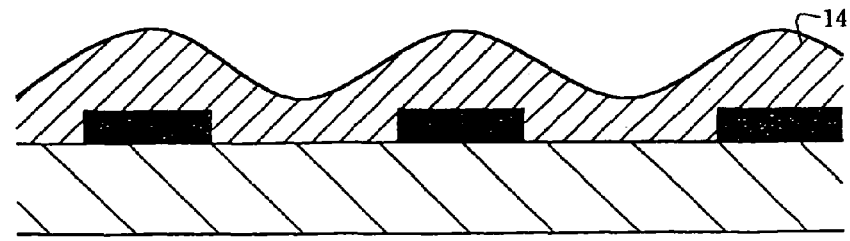

Further, FIG. 14(c) shows a state that after curing of the coated film for high refractive index film, the film is made into island shapes by pressing a part of the surface with an embossing roll 30 to deform or removing a part of the surface, and FIG. 14(*d*) shows a state that the low refractive index film 14 is formed on the formed high refractive index film 20.

By performing an embossing treatment as described above, unevenness can be formed on the flat surface of the high refractive index film 17 by using the embossing roll 30 to make the film into a discontinuous layer, as shown in FIG. 14.

Further, the shape of unevenness can also be controlled to be an arbitrary shape such as a pyramid shape, trapezoid shape or rhomboid shape by performing the embossing treatment or matting treatment.

For the embossing treatment, an embossing roll 30 having a protrusion height of 0.1 to 100 μm is preferably used, as shown in FIG. 14.

The above range is defined because if protrusion height of the embossing roll is less than 0.1 μm, the transfer pressure may become unduly high, or it may become difficult to uniformly perform the embossing treatment for the surface of the high refractive index film. The above range is, also defined because if the protrusion height of the embossing roll exceeds 100 μm, it may conversely become difficult to perform the embossing treatment with good precision, or the treatment speed may be lowered.

Therefore, for the embossing treatment, an embossing roll having a protrusion height of 0.2 to 70 μm is more preferably used, and an embossing roll having a protrusion height of 0.5 to 50 μm is still more preferably used.

It is preferable to use an embossing roll having a mesh of #50 to #100 for the embossing treatment.

The above range is defined because if the mesh of the embossing roll (protrusions) is a mesh of less than #50, it may become difficult to uniformly perform the embossing treatment for the surface of the high refractive index film, or the effect of antiscratching property may be degraded. The above range is defined also because if the mesh of the embossing roll is a mesh exceeding, #1000, it may become difficult to form the protrusions with good precision, or it may become difficult to perform the embossing treatment with good precision.

Therefore, for the embossing treatment, an embossing roll having a mesh of #75 to #500 is more. preferably used, and an embossing roll having a mesh of #100 to #300 is still more preferably used.

(6) Formation Method 6

For forming a discontinuous high refractive index film, a photolithography method is also preferably used. That is, a discontinuous high refractive index film is preferably formed by partially photocuring a coated film for high refractive index film containing a photocurable resin with exposure through a patterned photomask and then, developing the unexposed areas. An example of the production process of a high refractive index film utilizing such a photolithography method is shown in FIGS. 15(*a*) to (*d*).

FIG. 15(*a*) shows a stage that a substrate 12 is prepared, and FIG. 15(*b*) shows a state that a curable composition for high refractive index film is uniformly applied on the substrate 12 to form a flat coated film 17, and then the coated film is irradiated with an ultraviolet ray or electron beam 15 through a patterned photomask 19.

Further, FIG. 15(*c*) shows a state that after the coated film for high refractive index film is partially cured, the uncured portions (unexposed areas) were developed by using a developer, and FIG. 15(*d*) shows a state that the low refractive index film 14 is formed on the formed discontinuous high refractive index film 20.

By using the photolithography method as described above, it becomes possible to form a discontinuous high refractive index film with extremely good precision, even after the curable composition for high refractive index film is applied uniformly.

(7) Curable Composition for High Refractive Index Film and High Refractive Index Film Also in the second embodiment, the same curable composition for high refractive index film and high refractive index film as those explained for the first embodiment can be used.

Therefore, explanations therefor are omitted.

2. Step Of Forming Low Refractive Index Film (1) Formation Method

The low refractive index film is preferably formed by applying (coating) a curable composition for low refractive index film to a high refractive index film and then curing the coated film for forming low refractive index film.

Although the coating method is not particularly limited, for example, coating methods including a dipping method, spraying method, bar coating method, roll coating method, spin coating method, curtain coating method, gravure coating method, silk screen method, ink jet method and so forth may be used.

The coating film consisting of the curable composition for the low refractive index film is preferably heat-cured, because the composition can be thereby reacted with a part of the high refractive index film to form a firm coated film as a whole.

When the coating film consisting of the curable composition for the low refractive index film is heat cured, the coating film is preferably heated at 30 to 200° C. for 1 to 180 minutes.

This is because such a heating condition enables more efficient production of an antireflecting film laminate having excellent antireflecting property without impairing the substrate and the formed antireflection film.

Therefore, as for the heating condition, the low refractive index film is heated more preferably at 50 to 180° C. for 2 to 120 minutes, still more preferably at 60 to 150° C. for 5 to 60 minutes.

(2) Curable Composition for Low Refractive Index Film and Low Refractive Index Film Also in the second embodiment, the same curable composition for low refractive index film and low refractive index film as those explained for the first embodiment can be used.

Therefore, explanations therefor are omitted.

3. Step of Forming Hardcoat Layer

The production of the antireflection film laminate preferably includes the step of forming a hardcoat layer. That is, when the antireflection film laminate is produced, a hardcoat layer, is preferably provided by a coating method or the like, for example, on the substrate and under the discontinuous high refractive index film.

By providing a hardcoat layer as described above, the discontinuous high refractive index film can be firmly fixed and thereby restrained. Therefore, the antiscratching property of the low refractive index film into which the high refractive index film enters can be more improved by the function of the hardcoat layer.

EXAMPLES

Hereafter, examples of the present invention will be explained in detail. However, the scope of the present invention is not limited by the descriptions of these examples. In the examples, the amounts of the components are indicated in terms of part by weight unless specifically indicated.

Example 1

(1) Preparation of Curable Composition for Low Refractive Index Film (i) Preparation of Fluorine-Containing Polymer having a Hydroxyl Group The atmosphere in a stainless, steel autoclave having an internal volume of 1.5 and equipped with an electromagnetic stirrer was thoroughly replaced with nitrogen gas. The autoclave was then charged with 500 g of ethyl acetate, 34.0 g of ethyl vinyl ether (EVE), 41.6 g of hydroxyethylvinyl ether (HEVE), 75.4 g of perfluoropropyl vinyl ether (FPVE), 1.3 g of lauroyl peroxide, 7.5 g of a silicon-containing polymer azo initiator (trade name: VPS 1001, produced by Wako Pure Chemical Industries, Ltd.) and 1 g of a reactive emulsifier (trade name: NE-30, produced by Asahi Denka Kogyo KK), the mixture was cooled to −50° C. using dry ice-methanol, and oxygen in the system was purged with nitrogen gas again.

Then, 119.0 g of hexafluoropropylene (HFP) was further charged, and the temperature rise was started. The pressure in the autoclave was $5.5 \times 10^5$ Pa when the temperature in the autoclave reached 70° C. Thereafter, the reaction was continued at 70° C. for 20 hours with stirring. When the pressure decreased to $2.3 \times 10^5$ Pa, the autoclave was cooled with water to terminate the reaction. After the temperature of the reaction mixture was reached to room temperature, the unreacted monomers were discharged, and the autoclave was opened to obtain a polymer solution having a solid concentration of 30.0% by weight. The resulting polymer solution was poured into methanol to precipitate the polymer, and the polymer was further washed with methanol and dried at 50° C. under vacuum to obtain 170 g a fluorine-containing polymer having a hydroxyl group.

Intrinsic viscosity of the resulting fluorine-containing containing copolymer having a hydroxyl group was measured (by using N,N-dimethylacetamide solvent, measurement temperature: 25° C.) and found to be 0.28 dl/g.

Further, glass transition temperature of the fluorine-containing polymer was also measured by using DSC with a temperature increase rate of 5° C./min in a nitrogen flow and found to be 31° C.

Fluorine content of the fluorine-containing polymer was also measured by using the Alizarin Complexon method and found to be 51.7%.

Furthermore, hydroxyl group value of the fluorine-containing polymer was measured by using the acetyl method using acetic acid anhydride and found to be 102 mg KOH/g.

(ii) Preparation Of Curable Composition for Low Refractive Index Film

To a vessel equipped with a stirrer, 100 g of the fluorine-containing copolymer having a hydroxyl group which was obtained in (1), 11.1 g of Cymel 303 (alkoxylated methylmelamine compound, produced by Mitsui-Cytec Ltd.) and 3,736 g of methyl isobutyl. ketone (hereinafter referred to as "MIBK") were added, and the mixture, was stirred at 110° C. for 5 hours to allow the fluorine-containing copolymer having a hydroxyl group to react with Cymel 303.

Then, 11.1 g of Catalyst 4040 (produced by Mitsui-Cytec Ltd., solid concentration: 40% by weight) was further added, and the resulting mixture was stirred for 10 minutes to obtain a curable composition for low refractive index film (hereinafter also, referred to as the "coating solution A") having a viscosity of 1 mPas (measurement temperature: 25° C.).

Refractive index of a low refractive index film obtained from the resulting curable composition for low refractive index film was measured. That is, the curable composition for low refractive index film was applied to a silicon wafer by using a wire bar coater (#3) and air-dried at room temperature for 5 minutes to form a coating film.

Then, the coating film was heat-cured by using an oven at 140° C. for one-minute to form a low refractive index film having a film thickness of 0.3 μm. Then, the refractive index for the Na-D line of the resulting low refractive index film was measured at 25° C. by using a spectral elipsometer. The obtained results are shown in Table 1.

The film thickness was actually measured on a transmission electron micrograph of section, and an average was calculated (for ten points). As for a coated film having a non-flat undersurface, the film thickness was defined as an average distance between the lines in the roughness curve defined in JIS B0601 (measurement length: 1 μm).

The surface roughness (Rz) of the discontinuous low refractive index film was measured according to JIS B0601. That is, it was obtained as surface roughness (Rz) of low refractive index film using a measurement length of 1 μm on a transmission electron micrograph of section of cured film. The obtained results are shown in Table 1.

(2) Preparation of Curable Composition for High Refractive Index Film (i) Preparation of Reactive Alkoxysilane To a mixed solution of 7.8 g of mercaptopropyltrimethoxysilane and 0.2 g of dibutyltin dilaurate in a vessel was added dropwise 20.6 g of isophorone diisocyanate at 50° C. over one hour in dry air, and the mixture was further stirred at 60° C. for 3 hours.

Then, 71.4 g of pentaerythritol triacrylate was added dropwise to the reaction mixture at 30° C. over an hour, and then the mixture was further stirred at 60° C. for 3 hours to obtain a reaction solution.

The amount of the product contained in the reaction solution, namely, the residual isocyanate in the reactive alkoxysilane, was measured by FT-IR and found to be 0.1% by weight or less. Thus, it was confirmed that each reaction was run substantially quantitatively. It was also confirmed that a thiourethane bond, a urethane bond, an alkoxysilyl group and a reactive unsaturated bond were contained in the molecule.

(ii) Preparation of Curable Composition for High Refractive Index Film

In a vessel equipped with a stirrer, 260 g of an antimony-doped tin oxide dispersion (SNS-10M produced by Ishihara Techno Corp., dispersion solvent: methyl ethyl ketone, antimony-doped tin oxide content: 27.4% by weight, solid content: 30% by weight, weight average particle diameter and number average particle diameter measured by the dynamic light scattering method: 40 nm and 22 nm, respectively, henceforth also referred to as "ATO microparticle dispersion"), 25 g of the reactive alkoxysilane prepared in (i), 0.3 g of distilled water and 0.03 g of p-hydroxy monomethyl ether were mixed, and the mixture was stirred with heating at 65° C. After 5 hours, 8 g of methyl orthoformate was added to the mixture, and the mixture was further heated for one hour.

To the mixture, 6.1 g of Irgacure 907 (produced by Chiba Specialty Chemicals Corp.) as a photopolymerization initiator and 1,708 g of MIBK were added to obtain a curable composition for high refraction film (solid content: 5% by weight, amount of ATO microparticles in the solid content: 78% by weight, henceforth also referred to the "application solution B").

Refractive index of a high refractive index film obtained from the obtained curable composition for high refractive index film was measured. That is, the curable composition for high refractive index film was coated on a silicon wafer by using a wire bar coater (#3) and dried in an oven at 80° C. for 1 minute to form a coated film.

Subsequently, the coated film was cured by using a a metal halide ramp with an irradiation condition of 0.3 j/cm$^2$ to form a high refractive index film having a film thickness of 0.3 μm. The refractive index for the Na-D line of the obtained high refractive index film was measured at a measurement temperature of 25° C. by using a spectral ellipsometer. The obtained result is shown in Table 1.

The film thickness and surface roughness (Rz) were measured in the same manners, as those used for the low refractive index film. The obtained results are shown in Table 1.

(3) Formation of Hardcoat Layer

Under dry air, a mixture consisting of 8.7 g of the reactive alkoxysilane, 91.3 g of silica sol dispersed in methyl ethyl ketone (produced by Nissan Chemical Industries Co., Ltd., trade name: MEK-ST, average particle diameter: 22 nm, silica concentration: 30% by weight), 0.2 g of isopropyl alcohol and 0.1 g of ion exchanged water was stirred at 80° C. for 3 hours. Then, 1.4 g of methyl orthoformate was added to the mixture, and the mixture was further stirred at the same temperature for 1 hour.

After cooled to room temperature, the mixture was mixed with 21.9 g of trimethylolpropane triacrylate (produced by Shin-Nakamura Chemical Co., Ltd., trade name NK Ester A-TMPT), 10.95 g of trimethylolpropanetrioxyethyl acrylate (produced by Shin-Nakamura Chemical Co., Ltd., trade name: NK Ester A-TMPT-3EO), and 3.27 g of 2-hydroxycyclohexyl phenyl ketone (Chiba Specialty Chemicals Corp., trade name: Irgacure 184) to prepare a hardcoat composition (henceforth also referred to as the "application solution C").

(4) Preparation of Antirefilection Film Laminate

The obtained application solution C was coated on a polyester film A4300 (produced by Toyobo Co., Ltd., film thickness: 188 μm) by using a wire bar coater (#12) and dried in an oven at 80° C. for 1 minute to form a coated film. Subsequently, in the atmosphere, the coated film was cured with an ultraviolet ray by using a metal halide ramp with an irradiation condition of 0.3 J/cm$^2$ to form a hardcoat layer having a film thickness of 10 μm.

Then, the obtained application solution B was coated on the hardcoat layer by using a wire bar coater (#3) and dried in an oven at 80° C. for 1 minute to form a coated film. Subsequently, in the atmosphere, the coated film was cured with an ultraviolet ray by using a metal halide ramp with an irradiation condition of 0.3 J/cm$^2$ to form a high refractive index film having a film thickness of 0.05 μm in an island pattern (diameter of island: 0.1 to 1 μm).

Further, the obtained application solution A was coated on the high refractive index film by using a wire bar coater (#3) and air-dried at room temperature for 5 minutes to form a coated film. This coated film was heated at 140° C. for 1 minute by using an oven to form a low refractive index film as a continuous layer having a film thickness of 0.05 μm.

(5) Evaluation of Antireflection Film Laminate

The antiscratching property of the obtained antireflection film laminate was evaluated according to the following evaluation criteria.

The antiscratching property, reflectance, total light: transmission and turbidity (haze value) of the obtained antireflection film laminate were measured by the measurement methods described below.

(i) Antiscratching Property

The surface of the obtained antireflection film laminate was rubbed 30 times with #0000 steel wool under a load of 200 g/cm$^2$ and the antiscratching property of the antireflection film laminate was evaluated by visual inspection according to the following criteria. The obtained result is shown in Table 1.

Evaluation score 5: Generation of scratch was not observed at all.

Evaluation score 4: Generation of 1 to 5 of scratches was observed.

Evaluation score 3: Generation of 6 to 50 of scratches was observed.

Evaluation score 2: Generation of 51 to 100 of scratches was observed.

Evaluation score 1: Delamination of coated film was observed.

The antiscratching property corresponding to the evaluation score of 3 or more is practically acceptable, the antiscratching property corresponding to the evaluation score of 4 or more is preferred because such a film shows superior practical durability, and the antiscratching property corresponding to the evaluation score 5 is more preferred because the practical durability of such a film is markedly improved.

(ii) Reflectance and Total Light Transmission

The reflectance (the minimum reflectance at measurement wavelength) and the total light transmission of the obtained antireflection film laminate were measured at a wavelength in the range of, 340 to 700 nm according to JIS K7105 (Measurement method A) by using a spectral reflectance meter measurement apparatus (magnetic spectrophotometer U-3410, produced by Hitachi, Ltd., incorporated with a large-size sample chamber integrating sphere equipped apparatus 150-09090).

That is, the minimum reflectance based on the reflectance of an aluminum deposited film as a standard (100%) and the-total light transmission of the antireflection film laminate (antireflection film) were measured at each wavelength. The results are shown in Table 1.

(iii) Turbidity (Haze Value)

The haze value of the obtained antireflection film laminate was measured according to ASTM D1003 by using a color haze meter (produced by Suga Seisakusho Co., Ltd.). The obtained result is shown in Table 1.

Examples 2 to 5

In Examples 2 to 5, antireflection film laminates were prepared in which R1, R2 and the ratio of R1/D1 were changed by altering the average particle diameter and thickness of the high refractive index film in an island pattern as shown in Table 1, and evaluated for the antiscratching property and so forth. The obtained results are shown in Table 1.

Comparative Example 1

In Comparative Example 1, an antireflection film laminate was prepared in which the high refractive index film was provided as a continuous layer, and R1 and the ratio of R1/D1 were adjusted as shown in Table 1, and evaluated for the antiscratching property and so forth. The obtained results are shown in Table 1.

index film and film thickness (D2) of the high refractive index film and so forth into consideration.

Therefore, for example, even if a resin comparatively poor in antiscratching property such as a fluorine compound or a silicon compound is used for the surface side in order to reduce the refractive index, an antireflection film laminate exhibiting superior antiscratching property can be provided by using the structure according to the present invention without degrading transparency.

Furthermore, according to the method for producing an antireflection film laminate of the present invention, an antireflection film laminate exhibiting superior antiscratch-

TABLE 1

| Cured film | Example 1 | Example 2 | Example 3 | Example 4 | Example 5 | Example 6 | Comparative Example 1 |
|---|---|---|---|---|---|---|---|
| Film thickness of 1st layer (μm) | 0.05 | 0.10 | 0.15 | 0.09 | 0.05 | 0.05 | 3.00 |
| Film thickness of 2nd layer (μm) | 0.05 | 0.10 | 0.15 | 0.18 | 1.00 | 0.10 | 0.05 |
| | Island pattern | Island pattern | Island pattern | Island pattern | Island pattern | Island pattern | Continuous layer |
| Film thickness of 2nd high refractive index layer (μm) | | | | | | 1.00 Continuous layer | |
| Film thickness of 3rd layer (μm) | 10.0 | 10.0 | 10.0 | 10.0 | 10.0 | 10.0 | 10.0 |
| Refractive index of 1st layer | 1.41 | 1.41 | 1.41 | 1.41 | 1.41 | 1.41 | 1.41 |
| Refractive index of 2nd layer | 1.65 | 1.65 | 1.65 | 1.65 | 1.65 | 1.65 | 1.65 |
| R1 (μm) | 0.04 | 0.016 | 0.026 | 0.016 | 0.01 | 0.002 | 0.002 |
| R1/D1 | 0.800 | 0.160 | 0.174 | 0.180 | 0.200 | 0.040 | 0.0007 |
| R2 (μm) | 0.060 | 0.072 | 0.030 | 0.046 | 0.01 | 0.008 | 0.060 |
| R1/R2 | 0.670 | 0.220 | 0.870 | 0.360 | 1.000 | 0.250 | 0.030 |
| R2/D1 | 1.200 | 0.720 | 0.200 | 0.511 | 0.200 | 0.016 | 0.02 |
| R3 (μm) | 0.002 | 0.002 | 0.002 | 0.002 | 0.002 | 0.002 | 0.002 |
| Anti-steel wool property | 5 | 5 | 5 | 5 | 5 | 3 | 1 |
| Reflectance (%) | 1.00 | 0.08 | 0.15 | 0.05 | 0.20 | 2.00 | 2.80 |
| Total light transmission (%) | 93 | 94 | 93 | 93 | 91 | 84 | 88 |
| Haze (%) | 1.6 | 1.0 | 0.9 | 0.8 | 0.7 | 1.2 | 1.4 |

*The cured films of the 1st to 3rd layers were formed by using the application solutions A to C, respectively.
*First layer: Low refractive index film
Second layer: High refractive index film (first high refractive index film)
Third layer: Hardcoat layer Example 6

An antireflection film laminate was produced and evaluated in the same manner as in Example 1, except that a high refractive index film (second high refractive index film) was formed as a continuous layer having a film thickness of 1 μm, and then a high refractive index film (first high refractive index film) was formed in an island pattern having a film thickness of 0.1 μm (diameter: 0.1 to 1 μm). The obtained results are shown in Table 1.

INDUSTRIAL APPLICABILITY

According to the antireflection film laminate of the present invention, an antireflection film laminate exhibiting superior antiscratching property and transparency can be effectively provided by providing a discontinuous high refractive index film.

Further, according to a preferred embodiment of the antireflection film laminate of the present invention, an antireflection film laminate exhibiting superior antiscratching property and transparency can be provided by taking surface roughness (R1) of the low refractive index film, surface roughness (R2) of the high refractive index film, relationship of film thickness. (D1) of the low refractive ing property and transparency can be efficiently provided by forming a discontinuous high refractive index film.

What is claimed is:

1. An antireflection film laminate comprising
  a low refractive index film forming a surface side of the laminate and
  a high refractive index film which is disposed discontinuously under the low refractive index film and which is formed from a composition comprising at least inorganic oxide particles and photopolymerizable components,
  wherein the low refractive index film contacts a base of the laminate between the discontinuous regions of the high refractive index film; and
  wherein the refractive index of the low refractive index film is controlled to be from 1.35 to 1.5 and the refractive index of the high refractive index film is controlled to be from 1.45 to 2.1 so that the refractive index of the high refractive index film is larger than that of the low refractive index film.

2. The antireflection film laminate according to claim 1, wherein the high refractive index film is disposed in an island pattern with respect to the planar direction of the laminate.

3. The antireflection film laminate according to claim 1, wherein the base of the high refractive index film is selected from the group consisting of a hardcoat layer and a high refractive index film which is a continuous layer.

4. The antireflection film laminate according to claim 1, wherein an intermediate layer having a refractive index larger than the refractive index of the low refractive index film and the same as or smaller than the refractive index of the high refractive index film is provided between the low refractive index film and the high refractive index film.

5. The antireflection film laminate according to claim 1, wherein, when surface roughness (Rz according to JIS B0601) of the low refractive index film is represented by R1 (μm), surface roughness (Rz according to JIS B0601) of the high refractive index film is represented by R2 (μm), and film thickness of the low refractive index film is represented by D1 (μm), R1 is 2 μm or less, R2 is larger than R1 and in the range of 0.01 to 2 μm, and the ratio of R1/D1 is in the range of 0.01 to 2.

* * * * *